(12) United States Patent
Shadmon

(10) Patent No.: US 6,240,418 B1
(45) Date of Patent: *May 29, 2001

(54) DATABASE APPARATUS

(75) Inventor: Moshe Shadmon, Tel-Aviv (IL)

(73) Assignee: ORI Software Development Ltd., Tel-Aviv (IL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/047,189

(22) Filed: Mar. 24, 1998

Related U.S. Application Data

(63) Continuation-in-part of application No. 08/981,010, filed as application No. PCT/IL97/00248 on Jul. 22, 1997.

(30) Foreign Application Priority Data

Jul. 26, 1996 (IL) .................................................. 118959

(51) Int. Cl.⁷ ...................................................... G06F 17/30
(52) U.S. Cl. .............................................. 707/100; 707/101
(58) Field of Search ........................ 707/1–10, 100–104, 707/200–206; 711/1–6, 100–173, 200–221

(56) References Cited

U.S. PATENT DOCUMENTS

| | | |
|---|---|---|
| 4,606,002 | 8/1986 | Waisman et al. . |
| 4,945,475 | 7/1990 | Bruffey et al. . |
| 5,257,365 | 10/1993 | Powers et al. . |

(List continued on next page.)

OTHER PUBLICATIONS

Addison–Wesley XP002135679 120440, "The art of Computer Programming", vol. 3, 1998, pp. 471–479.

"Physical Data Organization Principles of Database Systems", J.D. Ullman, Jan. 1980, pp. 30–51.

G. Wiederhold, "File Organization for Database Design"; McGraw–Hill, 1987, pp. 131–133 and 272–273.

H.F. Korth and A. Silberschatz, "Database System Concepts", McGraw–Hill International Editions, 1986, pp. 45–172, 229–299.

Anderssin, A. et al: Efficient Implementation of Suffix Trees:, Software Practice & Experience, GB, John Wiley & Sons, Ltd., Chichester, vol. 25, No. 2, Feb. 1, 1995, pp. 129–141.

*Primary Examiner*—Ruay Lian Ho
(74) *Attorney, Agent, or Firm*—Oliff & Berridge, PLC

(57) ABSTRACT

A data processing system including a processor device associated with memory device. The processor is capable of running user application programs to communicate with a database management system that includes database file management system, for accessing data records stored in the memory. The database file management system includes: a probabilistic access indexing file (PAIF) having a plurality of nodes and links. The leave nodes of the PAIF are associated with data records accessible to the user application program. A portion of the data record constitutes a search-key. Selected nodes in the PAIF represent an offset of a search key portion within a search key and link(s) originated from each node among the selected nodes. For each of the selected nodes, except for the leaf node, there exists a subordinated node having an offset larger than the offset of the selected node. A search path in the PAIF commences from a root node and ends at a leaf node which is associated with a given search key. The search path defines a first series of I search key portion values at the corresponding I offsets which conform to a second series of I search key portions at the same I offsets within the given search key.

38 Claims, 23 Drawing Sheets

U.S. PATENT DOCUMENTS

| | | |
|---|---|---|
| 5,295,261 | 3/1994 | Simonetti . |
| 5,333,317 * | 7/1994 | Dann ......................................... 707/5 |
| 5,418,947 | 5/1995 | Hsu et al. ................................. 707/1 |
| 5,487,166 * | 1/1996 | Cossock .................................... 707/7 |
| 5,488,717 | 1/1996 | Gibson et al. . |
| 5,495,609 * | 2/1996 | Scott ........................................ 707/8 |
| 5,497,485 | 3/1996 | Ferguson et al. ........................ 707/1 |
| 5,530,957 | 6/1996 | Koenig ................................. 707/100 |
| 5,560,007 * | 9/1996 | Thai ........................................ 707/3 |
| 5,644,763 | 7/1997 | Roy . |
| 5,664,172 | 9/1997 | Antoshenkov . |
| 5,694,591 | 12/1997 | Du et al. . |
| 5,701,467 | 12/1997 | Freeston . |
| 5,737,732 | 4/1998 | Gibson et al. . |
| 5,752,243 | 5/1998 | Reiter et al. . |
| 5,761,652 | 6/1998 | Wu et al. . |
| 5,799,184 * | 8/1998 | Fulton et al. ............................. 707/2 |
| 5,799,299 | 8/1998 | Fujiwara . |
| 5,809,296 | 9/1998 | Yong et al. . |
| 5,842,196 | 11/1998 | Agarwai et al. . |
| 5,848,416 * | 12/1998 | Tikkanen ............................... 707/101 |
| 5,873,087 | 2/1999 | Brosda et al. . |
| 5,884,297 * | 3/1999 | Noven ...................................... 707/1 |
| 5,963,956 | 10/1999 | Smartt . |

OTHER PUBLICATIONS

Litwin, W. A. et al: "Trie Hashing With Controlled Load", IEEE Transations on Software Engineering, US, IEEE Inc., New York, vol. 17, No. 7, Jul. 1, 1991, pp. 671–691.

Knuth D. E.: "The Art of Computer Programming, vol. 3", 1988, Addison–Wesley, pp. 471–479; figures 29, 30.

* cited by examiner

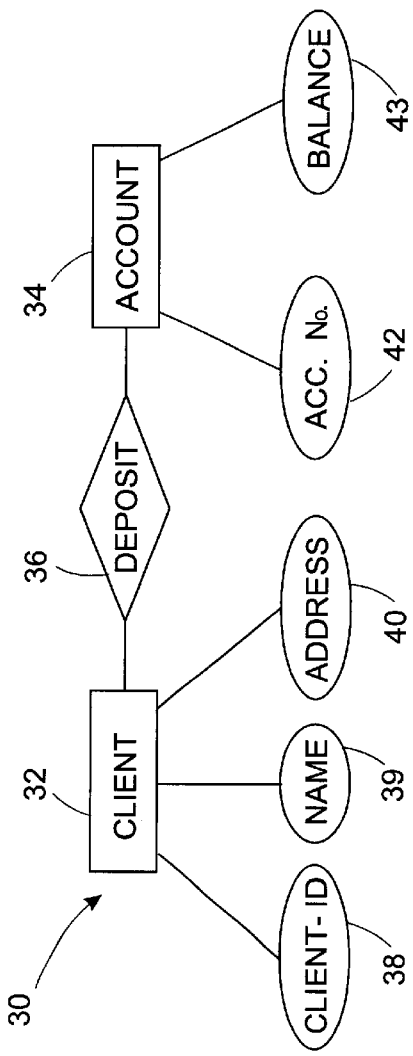

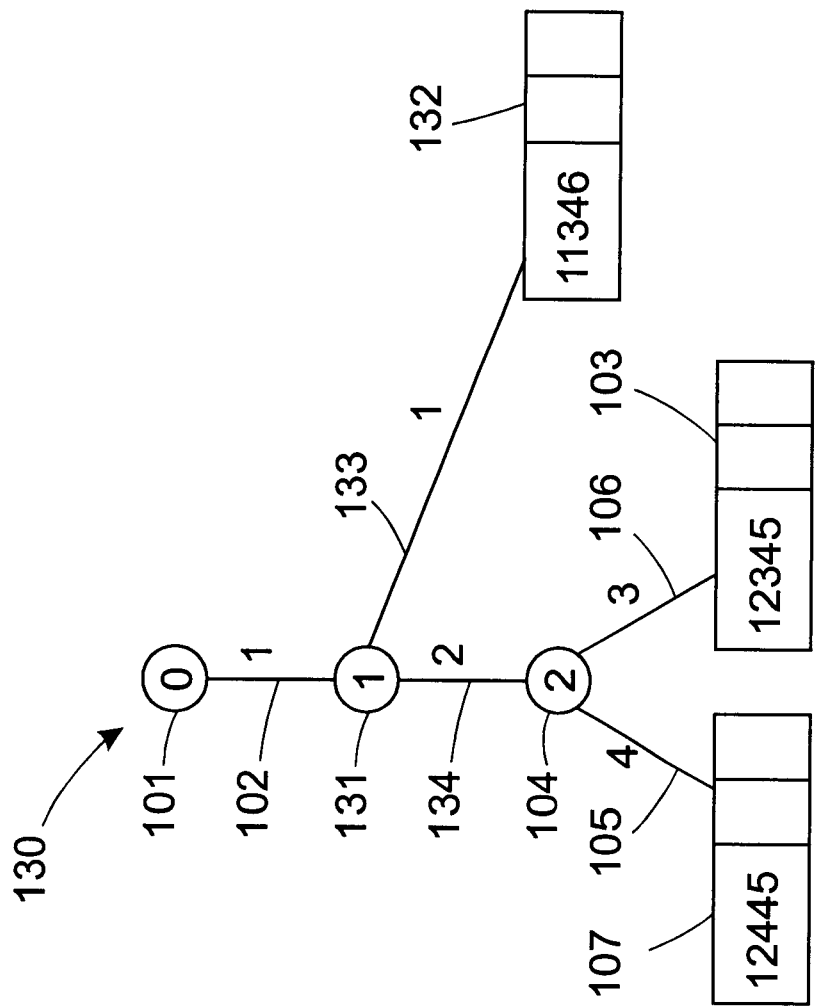

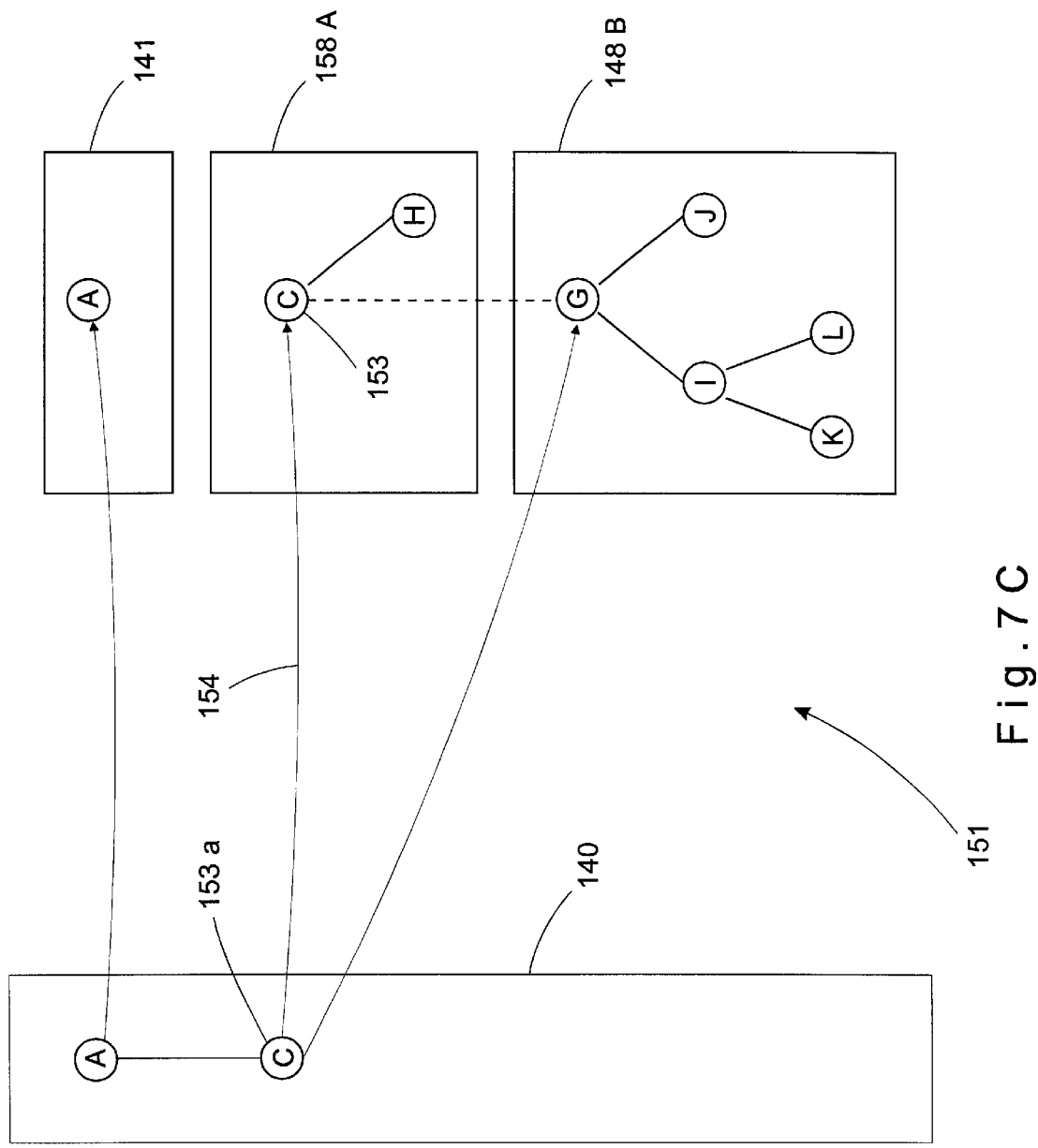

DATABASE APPARATUS

This is a Continuation-in-Part of Application No. 08/981,010 filed Mar. 3, 1998, which in turn is the U.S. National Stage of International Application No. PCT/IL97/00248 filed Jul. 22, 1997. The entire disclosure of the prior application(s) is hereby incorporated by reference herein in its entirety.

FIELD OF THE INVENTION

The present invention is in the general field of databases and database management systems.

BACKGROUND OF THE INVENTION

As is well known, a database system is a collection of interrelated data files and a set of programs that allow one or more users to add data retrieve and modify the data, stored in these files. The fundamental concept of a database system is to provide users with a so called "abstract" and simplified view of the data (referred to also as data model or conceptual structure) which exempts a conventional user from dealing with details such as how the data is physically organized and accessed.

Some of the well known data models (i.e. the "Hierarchical model", "Network model" and "Relational model" will now be briefly reviewed. A more detailed discussion can be found for example in: Henry F. Korth, Abraham Silberschatz, "Database System Concepts", McGRAW-Hill International Editions, 1986, Chapters 3–5 pp. 45–172).

Generally speaking, all the models discussed below have a common property in that they represent each "entity" as a "record" having one or more "fields" each being indicative of a given attribute of the entity (e.g. a record of a given book may have the following fields "BOOK ID", "BOOK NAME", "TITLE"). Normally one or more attributes constitute a "key" i.e. it uniquely identifies the record. In the latter example "BOOK-ID" serves as a key. The various models are distinguished one from the other, inter alia, in the way that these records are organized into a more complex structure.

Relational Model—The relational model, introduced by Codd, is a landmark in the history of database development. In relational databases an abstract concept has been introduced, according to which the data is represented by tables (referred to as "relations") in which the columns represent the fields and rows represent the records.

The association between tables is only conceptual. It is not a part of the database definition. Two tables can be implicitly associated by the fact that they have one or more columns whose values are taken from the same set of values (called "domain").

Other concepts introduced by the relational model are high level operators that operate on tables (i.e., both their parameters and results are tables) and comprehensive data languages (now called 4th generation languages) in which one specifies what are the required results rather than how these results are to be produced. Such non-procedural languages (SQL—Structured Query Language) have become an industry standard. Furthermore, the relational model suggests a very high level of data independence. There should not be any effect on the programs written in these languages due to changes in the manner data are organized, stored, indexed and ordered. The relational model has become a de-facto standard for data analysts.

Network Model—In the relational model, data (and relationship between data) are regarded as a collection of tables. In distinction therefrom in the network model data are represented as a collection of records whereas relationship between the records (data) are represented as links.

A record in the network model is similar to an "entity" in the sense that it is a collection of fields each holding one type of data. The links may be effectively viewed as pointers. A collection of records and the relation therebetween constitutes a collection of arbitrary graphs.

Hierarchical Model—The Hierarchical Model resembles the network model in the manner that data and relations between data are treated, i.e. as records and links. However, in distinction from the network model, the records and the relations between them constitute a collection of trees rather than of arbitrary graphs. The structure of the Hierarchical Model is simple and straightforward particularly in the case that the data that needs to be organized in a database are of inherent hierarchical nature. Consider for example a basic entity "Employee" with the following subordinated attributes "Employee_Salary" and "Employee_Attendance". The latter may also have subordinated attributes e.g. "Employee_Entries" and "Employee_Exits". In this scenario the data is of inherent hierarchical nature and therefore should preferably be organized in the hierarchical model. This, however, is typically not the case. Consider, for example, a scenario where "Employee" is assigned to several "Projects" and the time he/she spends ("Time_Spent") in each project is an attribute that is included in both the "Employee" and "Projects" entities. Such arrangement of data cannot be easily organized in the hierarchical model and one possible solution is to duplicate the item "Time_Spent" and hold it separately in the hierarchies of "Employee" and "Project". This approach is cumbersome and error prone in the sense that it is now required to assure that the two instances of "Time_Spent" are kept identical at all times. Since in real life scenarios arrangements of data that do not have inherent hierarchial structure are very common, the hierarchial model is inappropriate for serving as a database in many real-world scenarios.

As mentioned in the foregoing, data models deal with the conceptual or logical level of data representation and "hide" details such as how the data are physically arranged and accessed. The latter characteristics are normally dealt with by a so-called "database file management system". The main goal of the database file and system management (referred to occasionally also as "database engine") is to enhance database performance in terms of time (i.e. from the user's standpoint fast response time of the database), and space (i.e. to minimize the storage volume that is allocated for the database files). As is well known in the art, normally, there is a trade off between the time and space requirements. The performance of the database depends on the efficiency of the data structures that are used to represent the data and how efficiently the system can operate on these data. A detailed discussion on conventional file and management systems is given for example in Chapters 7 (file system structure) and 8 (indexing and hashing) in "Database System Concepts", ibid.

A database engine maps the logical structure into physical files and affords access path to the database records. The following techniques are typically utilized by known database engines in order facilitate access to data.

Hashing—This technique is usually a very quick method for locating a record once the value of its key is known. It involves the translation of the key into a pointer by some formula and then a direct access. Its drawbacks are that only one access key can be used on the same record and that a good translation ("hashing") formula is not always available. The access usually requires one I/O operation, but there are cases when the formula maps more than one record to the same position. This situation requires additional operations to resolve the conflicts. If the "hashing" formula is good these cases are rare, and therefore the average number of I/O operations is somewhat greater but not much greater than one.

Full indexing—This technique can be used to create a virtually unlimited number of access paths to the same data. The index is a search pattern, which ultimately locates the data. Its main disadvantages are that it requires space (usually all the keys to the records plus some pointers) and maintenance (addition and/or deletion of keys whenever a record is added and/or deleted respectively, or when its key is updated). Normally, the nature of the indexing technique as well as the volume of the data held in the files determine the number of I/O operations that are required to retrieve, insert, delete or modify a given data record.

Various types of indexing schemes have been developed but, normally, an indexing implementation is more costly than the aforementioned techniques. On the other hand, indexing is the simplest and most common method for acquiring multiple access paths to the same data. One of the most widely used indexing algorithms is the B-TREE (under various commercial product names) in which the keys are kept in a balanced tree structure and the lowest level points at the data itself.

Detailed explanation of the $B^+$ Tree indexing algorithm (and its derivative indexing algorithm the B-Tree) can be found in "Database System Concepts" ibid. pp. 275–282. The number of I/O operations obeys the algorithmic expression $Log_K N+1$ where K is an implementation dependent constant and N is the total number of records. This means that the performance slows down exponentially as the number of records increases, which will at some point, cause unacceptably slow response time.

It is possible, of course, to use a combination of the above or other techniques, e.g. an indexing technique in combination with a linked list of records (i.e. records that are serially linked by means of one or bi-directional pointers). Normally, the beginning of the list (i.e. the first record in the list) is acceded by indexing technique and thereafter the pointers are followed until the sought record is found.

One of the significant drawbacks of the aforementioned popular $B^+$-Tree indexing algorithm is that the indices portion of the data is not only held as an integral portion of the data of the leaves of the tree, but is also held in the interim nodes of the tree serving as a search path for realizing "FIND", "INSERT" and/or "DELETE" record actions. This results, of course, in the undesired inflation of the database size and the latter drawback is further aggravated when indexes of large size are utilized (i.e. when a relatively large number of bits is required for representing the index).

One possible approach to cope with this problem is to exploit the tries (pronounced "try-S") indexing technique discussed, for example, in G. Wiederhold, "File organization for Database design"; Mcgraw-Hill, 1987, pp. 272, 273.

Generally speaking, the tries indexing technique enables a rapid search whilst avoiding the duplication of indexes as manifested for example by the $B^+$ technique. The tries indexing file has the general structure of a tree wherein the search is based on partitioning the search according to search key portions (e.g. search key digit or bit). Thus, for example each node in the tries indexing file represents a digit position of a search key and the link to any one of its children represents the digit's value. The tries structure affords efficient data structure in terms of the memory space that is allocated therefor, since the search-key is not held, as a whole, in interim nodes and hence the duplication that is exhibited for example in the $B^+$ indexing technique is avoided.

In order to achieve enhanced performance in terms of response time, a tries indexing file should be built by selecting the digits (or bits) from the search key such that the best possible partition of the search space in obtained, or in other words so as to accomplish a tree which is as balanced as possible.

Hitherto known tries indexing file structures have inherent drawbacks. Thus, for example, as is well known to those versed in the art and as explained in "File organization for Database design", ibid., the goal of obtaining a balanced tree necessitates prior knowledge of index values (which necessarily entails prior knowledge of the data records in the file). However, normally there is no prior knowledge of the contents of a database (e.g. consider a database that holds an inventory of items stored in a warehouse. Clearly the inventory of items dynamically changes as new shipments of items are either received from suppliers or delivered to clients), the drawbacks of the pre-requisite requirement of knowing the contents of the database in order to accomplish efficient tries structure are obvious. Another clear drawback of the conventional tries structure is that the data is not kept in a sorted form which hinders the conducting of the efficient search of related items (e.g. this difficulty is exhibited for example when responding to the query: in a database that holds particulars of supplier, retrieve the full name and address of all suppliers having a surname that starts with 'A'). Accordingly, the tries indexing file of the kind specified exhibits only a theoretical concept which from commercial standpoint is practically infeasible.

It is therefore the object of the present invention to reduce the drawbacks of data processing systems that exploit hitherto known database file management system. Specifically, it is the object of the present invention to provide for a data processing system that exhibits an enhanced database performance by utilizing an efficient database file management system.

GLOSSARY

For clarity of explanation, there follows a glossary of terms used frequently throughout the description and the appended claims. Some of the terms are conventional and others have been coined.

Block—a storage volume unit which is loaded in its entirety into the memory of the computer. A block may contain data arranged in any desired manner, e.g. nodes arranged as a tree and possibly also pointers to actual data records.

Tree—a data structure consisting of a root node linked by means of n ($n \geq 1$) pointers (or links) to respective n children nodes each of which may be linked in a similar manner to up to n children nodes and so forth. A node in the tree that is not linked to any children node is designated a "leaf node". The nodes in the tree that do not constitute "root" or "leaf" are designated as "interim" nodes. Interim nodes constitute, each, a "root" of a sub-tree of the specified tree. For any given node in the tree, all the nodes that can be accessed by moving along the pointers towards the leaves are designated as "subordinated nodes" of said given node, whereas all the nodes that can be accessed by moving in the opposite direction, i.e. towards the root are designated as "predecessor nodes" of said given node.

"Node" should be construed in a broad sense. Thus, the definition of tree encompasses also a tree of blocks wherein each node constitutes a block. For detailed definition of "tree", refer also to the book "Graph Algorithms" by S. Even.

Binary tree—is a tree wherein n=2.

Depth of a tree—is defined as the path in terms of number of nodes that lead from a root node to a given leaf node in the tree.

Balanced tree—a tree having the same depth for all leaf nodes in the tree. As a rule, a balanced (or essentially balanced) tree normally involves, on the average, less I/O operations in order to access a given data record and is therefore deemed more efficient than a counterpart non-balanced tree.

File-Indexes (or indexing file)—According to G. Wiederhold, "File organization for Database design"; Mcgraw-Hill, 1987, pp. 131, "indexes are a collection of entries one for each data record, containing a value of a key attribute for that record, and reference pointer which allows immediate access to that record". There are known in the art various indexing techniques such as index-sequential files, $B^+$-Tree or B-Tree index files and others. The $B^+$-Tree index files comply with the general structure of essentially balanced trees wherein interim nodes hold index value (or search keys) of the records and the latter are held at the leaves. As specified above, one of the significant shortcomings of $B^+$ Tree structures is that the indexes are duplicated, i.e. they are held both at the interim level serving for search path purposes and at the leaf level as a part of the pertinent data record.

Conventional tries indexing file—The general structure of a conventional tries structure was defined and discussed in the above "Background of the Invention" section and is also discussed in the book "File organization for Database design", ibid.

In the context of the present invention a so called "Probabilistic Access Indexing File" (referred to also as "PAIF") is utilized which is distinguished from the conventional tries indexing file, inter alia, in the following respects:

(i) it does not necessarily comply with the general structure of a tree, i.e. whereas in a conventional tree each node (except for the root) has exactly one father node, in the PAIF a node may have more than one father; (ii) whilst the PAIF exploits the general technique of partitioning the search according to search key portions (e.g. search key digit or search key bit(s) as in a conventional tries indexing file), the manner in which this technique is realized (see below) is well distinguished from the conventional tries indexing file thereby coping with the above referred to inherent drawbacks of the conventional file indexing technique and yielding advantages as will be explained in greater detail below.

It should be noted that for clarity of explanations the hereinbefore "binary", "balanced" and "depth" terms that are used with respect to a "tree" also apply to a PAIF. Thus, for example, a binary PAIF has at most two children nodes for any given node therein.

As will be explained in greater detail below, a node in a PAIF is not necessarily classified uniquely.

GENERAL DESCRIPTION OF THE INVENTION

There is thus provided in accordance with the invention, a data processing system including a processor device associated with memory device; said processor device is capable of running at least one user application program capable of communicating with a database management system that includes database file management system, for accessing data records stored in said memory device; said database file management system comprising:

at least one probabilistic access indexing file (PAIF) that includes:

a plurality of nodes each of which, except for the leaf nodes, is connected by means of at least one link to a respective at least one child node; each leaf node in said PAIF is associated with at least one data record accessible to said user application program; at least a portion of said data record constitutes an n-long-bit search-key having a most-significant-bit (MSB) thereof at an offset 0 and the remaining n−1 bits thereof at respective offsets 1 to n−1;

selected nodes in said PAIF represent, each, a given offset of an l-bit-long search-key-portion within said n-long-bit search key; link(s) originated from each one of said selected nodes represents, each, a unique value of said l-bit-long search key portion; for each one of said selected nodes, except for the leaf node, there exists at least one node, subordinated thereto, having an offset larger than the given offset of said one selected node;

whereby for any search key in a record associated with a leaf node of said PAIF, there is defined a search path that includes a series of units, each consisting of a node from among said selected nodes, and a link; the search path commencing at the root node and ending at said leaf node such that for any unit in the series, the value of the l-bit-long search-key-portion at a given offset as indicated, respectively by the link and the node of said unit, conforms the value of the corresponding l-bit-long portion at said given offset within said search key.

For sake of clarity, a new nomenclature is introduced in order to distinguish between two types of links in a PAIF. Thus, "long link" stands for a link which connects a leaf node to a data record, or an inter-block connection, i.e. it connect nodes residing in two separate blocks. Long links, typically but not necessarily, necessitate I/O operations. "Short link" stands for an intra-block connection, i.e. it links two nodes residing in the same block.

A database file management system that employs a PAIF of the invention is advantageous, in terms of enhanced performance as compared to hitherto known techniques inter alia owing to the following characteristics:

The data can be accessed inherently in a sorted form according to a search key.

There is no requirement for in advance knowledge of the contents of the data base.

An essentially balanced tree of blocks is retained and the depth of the tree is relatively small, thereby minimizing in the average the number of slow I/O operations that are required in order to add, delete or retrieve data Data records of different types (i.e. belonging to different entities) and search keys of different lengths may reside in the same PAIF A search key, as a whole, is held only as an integral part of the data record thereby avoiding duplication of search keys, as exhibited for example in the conventional $B^+$ Tree indexing technique.

A detailed discussion as regards the various advantages offered by the database file management system of the invention is given below with reference to specific embodiments.

It should be noted that the data records may constitute part of the PAIF, or may reside in one or more separate data files.

In the latter embodiment the data records should be linked, of course, to the corresponding PAIF. As will further be clarified with reference to the description of specific embodiment below, a given data record may accommodate more than one search key.

Still further the invention provides for a data processing system including a processor device associated with memory device; said processor device is capable of running at least one user application program capable of communicating with a database management system that includes database file management system, for accessing data records stored in said memory device; said database file management system comprising:

- at least one probablistic access indexing file (PAIF) having a plurality of nodes and links;
- the leave nodes of said PAIF are associated each with at least one data record accessible to said user application program and wherein at least a portion of said data record constitutes at least one search-key;
- selected nodes in said PAIF represent, each, a given offset of a search key portion within said search key; link(s) originated from each given node from amongst said selected nodes, represent, each, a unique value of said search key portion;
- the PAIF having at least two sub-PAIF's being arranged, each, in a block;
- said data base file management system is further capable of arranging said blocks as an essentially balanced tree of blocks.

It should be noted that said selected nodes, whilst preferably including only a given offset, this is not always necessarily the case. Thus, one or more of said nodes may include other information, such as portions of the keys and/or other information, all as required and appropriate. Accordingly, the term "represents" encompasses also a situation where one or more of the nodes includes information, in addition to offsets, all as required and appropriate.

In accordance with another aspect, the invention provides for a data processing system including a processor device associated with memory device; said processor device is capable of running at least one user application program capable of communicating with a database management system that includes database file management system, for accessing data records stored in said memory device; said database file management system comprising:

- at least one probablistic access indexing file (PAIF) having a plurality of nodes and links;
- the leaf nodes of said PAIF are associated each with at least one data record accessible to said user application program and wherein at least a portion of said data record constitutes at least one search-key;
- selected nodes in said PAIF represent, each, a given offset of a search key portion within said search key; link(s) originated from each given node from among said selected nodes, represent, each, a unique value of said search key portion;
- the PAIF having at least two sub-PAIF's being arranged, each, in a block;
- said PAIF represents ordered structure of said data records. The present invention further provides for a method of maintaing a balanced tree structure when a block in the tree, is filled with nodes; said block constituting a full block; the tree including blocks each accommodating a plurality of nodes and links originated from said nodes; leaf nodes from among said nodes are connected to data records; the method comprising executing the following steps:
  - (i) replacing said full block with at least two split blocks such that few from among the nodes of said split block are accommodated within one of said split blocks and the remaining nodes from among the nodes of said split block are accommodated within the other split blocks;
  - (ii) coping at least one node from among said nodes into a block such that said at least two split blocks being children blocks thereof and the search path characteristics are retained.

BRIEF DESCRIPTION OF THE DRAWINGS

For a better understanding the invention will now be described, by way of example only, with reference to the accompanying drawings, in which:

FIG. 3 shows the database of FIG. 2, represented as tables in accordance with the relational data model, with each table holding few data occurrences;

FIGS. 7A–7C show schematic illustrations exemplifying succession of split block operations, according to one embodiment of the invention;

DETAILED DESCRIPTION OF PREFERRED EMBODIMENTS

Figure 1:
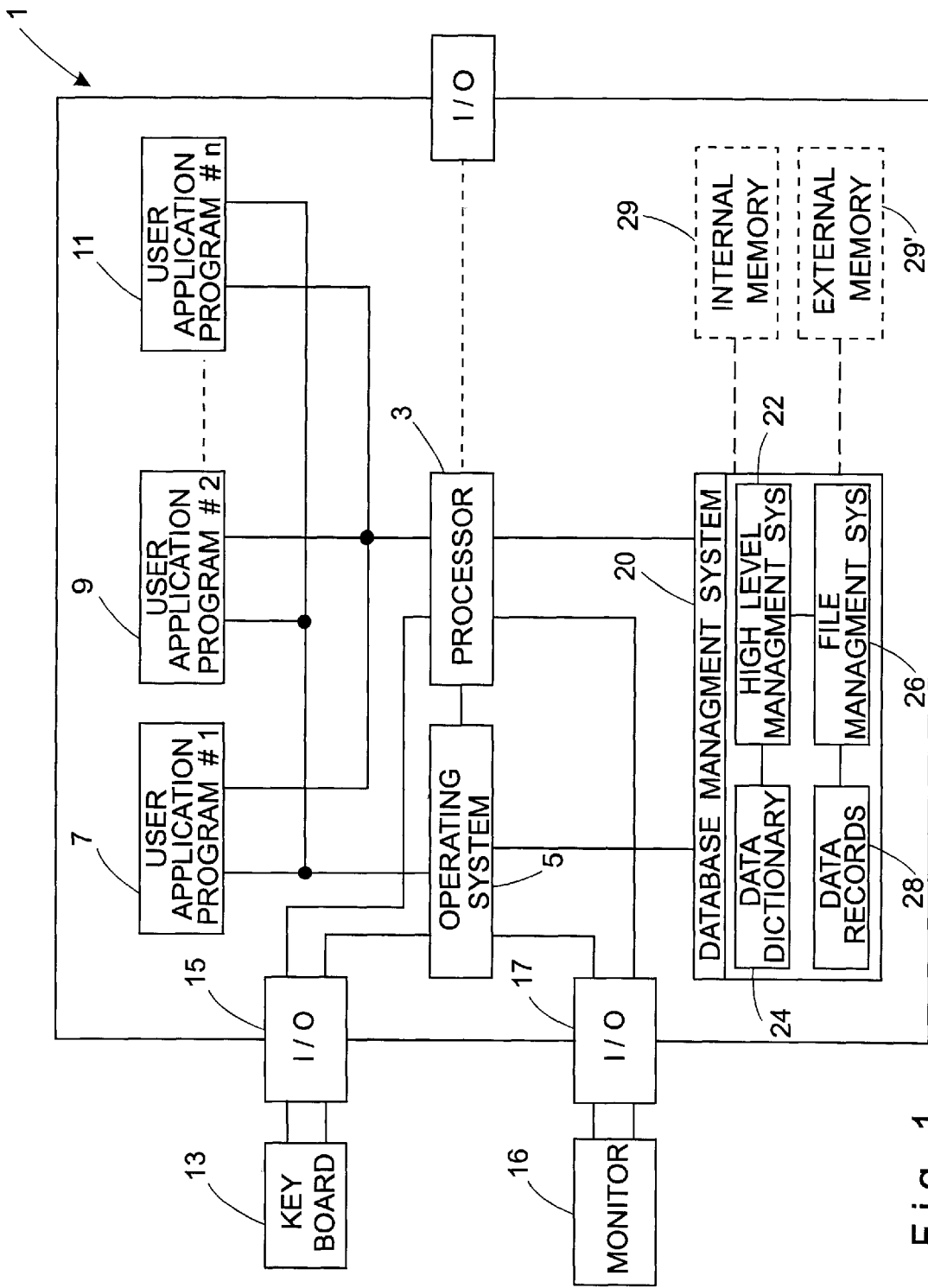
FIG. 1 shows a generalized block diagram of a system employing a database file management system.

Attention is first directed to FIG. 1 showing a generalized block diagram of a system employing a database file management system of the invention. Thus, a general purpose computer 1, e.g. a personal computer (P.C.) employing a Pentium® microprocessor 3 commercially available from Intel Corp. U.S.A, has an operating system module 5, e.g. Windows NT® commercially available from Microsoft Inc. U.S.A., which communicates with processor 3 and controls the overall operation of computer 1.

P.C. 1 further accommodates a plurality of user application programs of which only three 7, 9 and 11, respectively are shown. The user application programs are executed by processor 3 under the control of operating system 5, in a known per se manner, and are responsive to user input fed through keyboard 13 by the intermediary of I/O port 15 and the operating system 5. The user application programs further communicate with monitor 16 for displaying data, by the intermediary of I/O port 17 and operating system 5. The user application programs can access data stored in a database by means of database management system module 20. The generalized database management system, as depicted generally in FIG. 1, includes high level management system 22 which views, as a rule, the underlying data in a "logical" manner and is responsive, to the user application program by means known per se such as, e.g., SQL Data Definition and Data Manipulation language (DDL and DML). The database management system typically exploits, in a known per se manner, a data dictionary 24 which describes the logical structure of the underlying data.

The underlying structure of the data is governed by database file management system 26 which is associated with the actual data records 28. The "high-level" logical instructions (e.g. SQL commands) received and processed by the high-level management system 22 are converted into "lower level" commands that facilitate access paths to the data records that are stored in the database file(s) and to this end the database file management system considers the actual structure and organization of the data records. The "high level" and "low level" portions of the database file management system can communicate through a known per se Application Programmers Interface (API), e.g. the ODBC standard ver. 2.0 commercially available from Microsoft. The utilization of the ODBC enables "high level" modules of the database file management system to transparently communicate with different "database engines" that support the ODBC standard. As is well known to those versed in the art, the advantage of the latter characteristics is brought about, for example, by substituting a new, faster and more efficient ODBC compatible "database engine" for an older one, whilst retaining the "higher level" modules of the database management system intact The term access to data or data records used herein encompass all kind of data manipulation including "find", "insert", "delete" and "modify" data record(s), and the pertinent DDL commands which afford the construction, modification and deletion of the database.

FIG. 1 further shows, schematically, an internal memory module 29 (e.g. 16 Mega byte and possibly employing a cache memory sub-module) and an external memory module 29' (e.g. 1 gigabyte). Typically, external memory 29 is accessed through an external, relatively slow communication bus (not shown), whereas the internal memory is normally accessed by means of a faster internal bus (not shown). Normally, by virtue of the relatively small size of the internal memory, only those applications (or portions thereof) that are currently executed are loaded from the external memory into the internal memory. By the same token, for large databases that cannot be accommodated in their entirety in the internal memory, a major portion thereof is stored in the external memory. Thus, in response to an application generated query that seeks for one or more data records in the database, the database management system utilizes operating system services (i.e. an I/O operation) in order to load, through the external communication bus, one or more blocks of data from the external to the internal memory. If the sought data records are not found in the loaded blocks, successive I/O operations are required until the sought data records are targeted.

It should be noted that for simplicity of presentation, the internal and external memory modules 29, 29', are separated from the various modules 5, 7, 9, 11, 20. Clearly, albeit not shown, the various modules (operating system, DBMS, and user application programs) are normally stored in the external memory and their currently executed portions are loaded to the internal memory.

Computer 1 may serve as a workstation forming part of a LAN Local Area Network (LAN) (not shown) which employs a server having also essentially the same structure of FIG. 1. To the extent that the workstations and the server employ client-server based protocols a predominant portion of said modules (including the database file management system 26 and the database records themselves 28) reside in the server.

Those versed in the art will readily appreciate that the foregoing embodiments described with reference to of FIG. 1 are only two out of many possible variants. Thus, by way of non-limiting example, the database may be an on-line database residing in an Internet Web site. It should be further noted that for clarity of explanation system 1 is illustrated in a simplified and generalized manner. A more detailed discussion of database file management systems and in particular of the various components that are normally accommodated in database file management systems can be found, e.g. in Chapter 7 of "Database System Concepts" ibid.

Figure 6B:
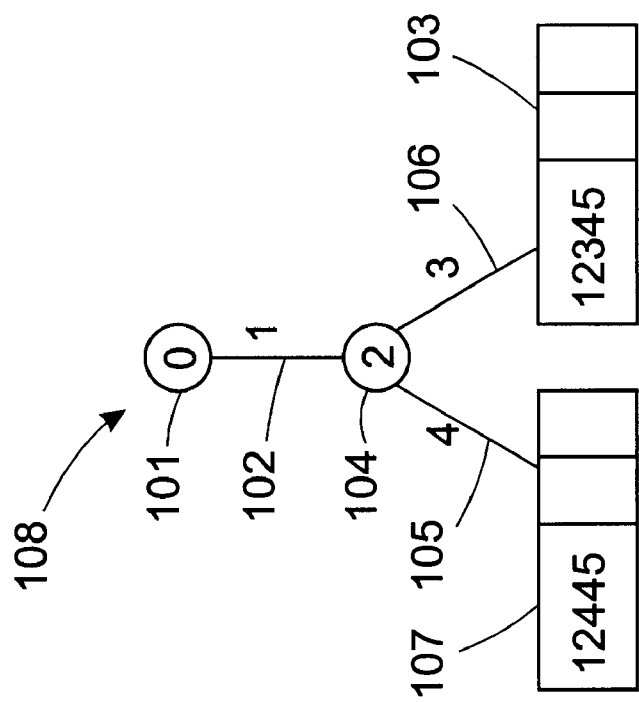
FIGS. 6A–6C show a succession of the underlying indexing file structure of the "CLIENT" table of FIG. 3, in accordance with file management system employing "CLIENT" table of FIG. 3, in accordance with file management system employing PAIF utilized by a database file management system of the invention, all residing in a single block.
Figure 6A:
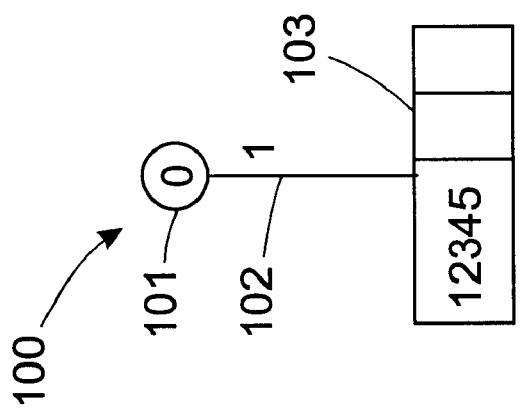
Figures 2, 6C:
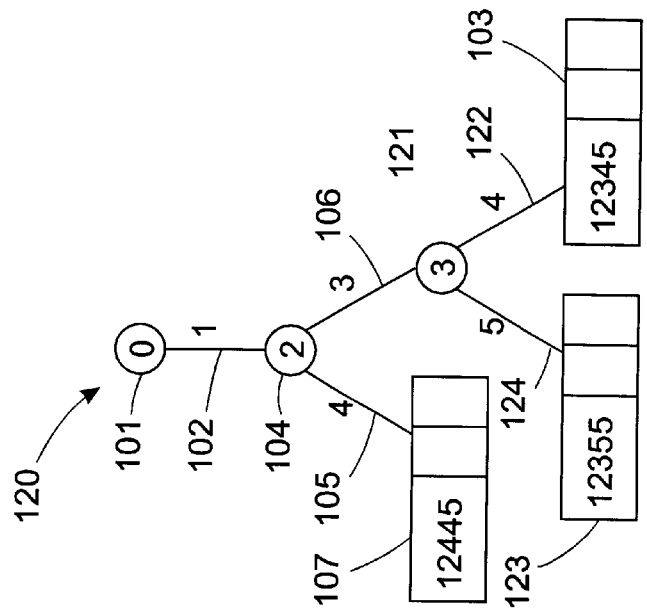
FIG. 2 shows a sample database structure represented as an Entity Relationship Diagram (ERD), and serving for illustrative purposes.
Figures 1, 6C:
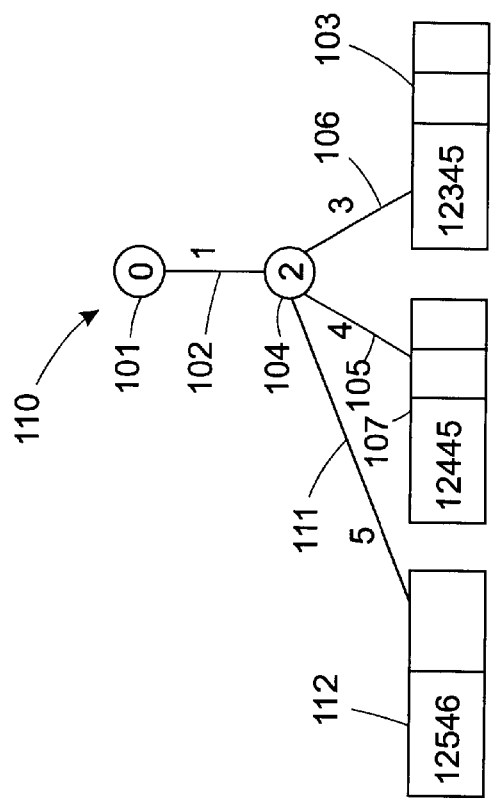

Having described the general structure of a system of the invention, attention is now directed to FIG. 2 showing a sample database structure represented as Entity Relationship Diagram (ERD), and serving for illustrative purposes. Thus, the ERD 30 of FIG. 2 consists of the entities "CLIENT" 32 and "ACCOUNT" 34 as well as an "n to m" "DEPOSIT" 36 relationship indicating that a given client may have more than one account and by the same token a given account may be owned by more than one client.

As shown, the entity "CLIENT" has the following attributes (fields): "Client__Id" 38 being a key attribute that uniquely identifies each client, "Name" 39 standing for the client's name and "Address" 40 standing for the client's address. The entity "ACCOUNT" has the following attributes (fields): "Acc__No" 42 being a key attribute that uniquely identifies each account, and "Balance" 43 holding the balance of the account. The relationship "DEPOSIT" consists of pairs of keys of the "CLIENT" and "ACCOUNT" entities, such that each pair is indicative of particular account owned by specific client.

Turning now to FIG. 3, there is shown a database of FIG. 2, represented as three tables 50, 51 and 52 corresponding to the relational data model, 32, 34 and 36, respectively, with each table holding a few data occurrences for illustrative purposes. It should be noted that the length of the key field ("Client_ID") of the "CLIENT" table is 5 digits, whereas the length of the key field ("Acc_ID") of the "ACCOUNT" table is 6 digits. The client table holds 5 data occurrences 55–59, the account table holds 2 data occurrences 65, 66 and the deposit table holds 3 data occurrences 70–72.

Figure 4:
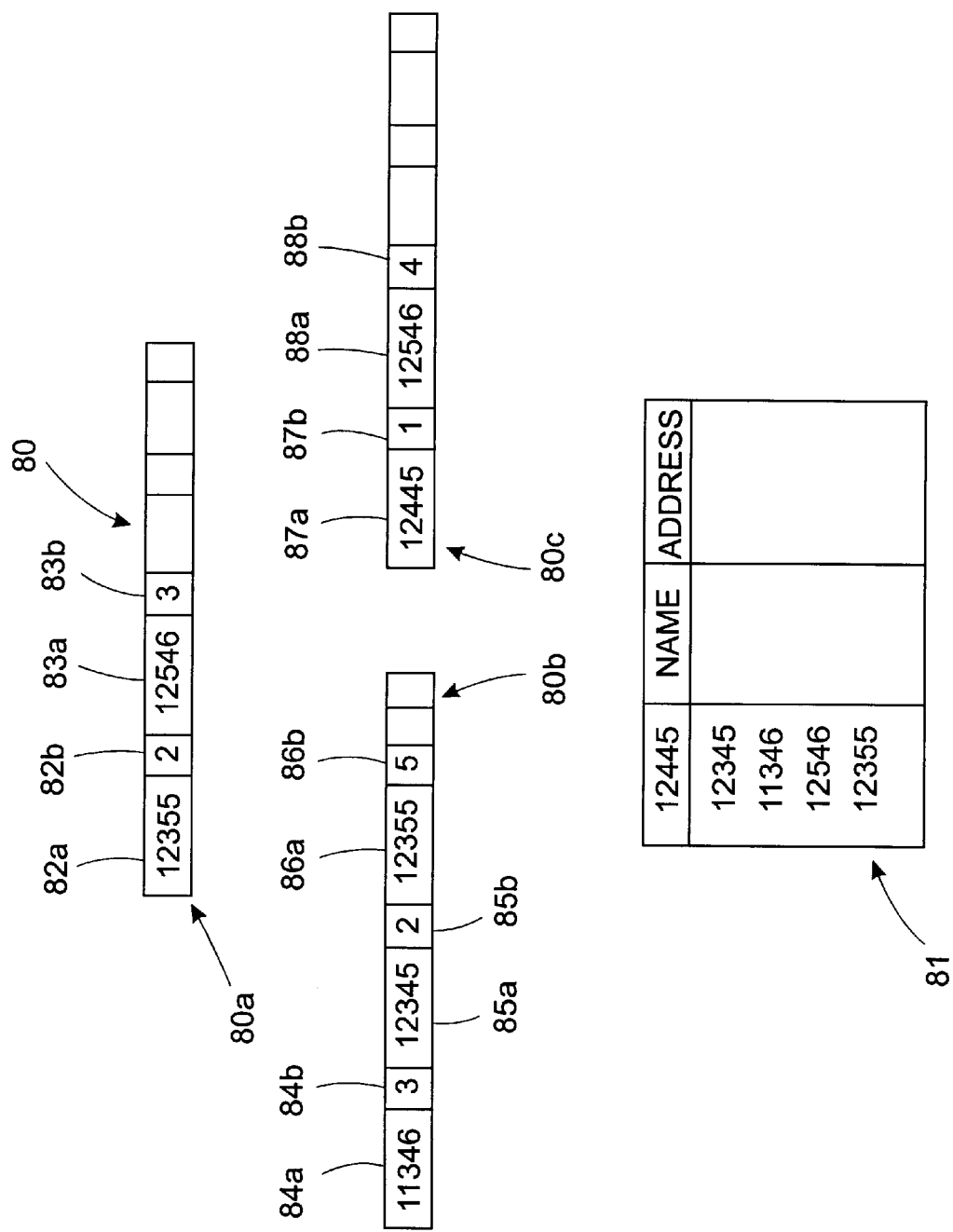
FIG. 4 shows an underlying indexing file structure of the "CLIENT" table of FIG. 3, in accordance with file management system employing conventional $B^+$ tree indexing file technique.

In accordance with prior art techniques each table is, as a rule, organized in a different file. Thus, FIG. 4 illustrates an underlying indexing file structure of the "CLIENT" table of FIG. 3, in accordance with file management system employing the conventional $B^+$ tree indexing file technique. As shown, the indexing file 80 consists of three blocks 80a–c standing for a root block and two leaf blocks respectively. The data records are organized in a separate file 81 holding the five data records 55–59 (in FIG. 3). Each block consists of a succession of pair of fields (e.g. 82a–b and 83a–b in block 80a). In each pair the first field stands for a search key value and the second field stands for a pointer to the next block to search, or in the case of a leaf block an address of the data record.

Thus, search key 12355 (82a) block 80a can be found in block 80b (by pointer 82b). In block 80b, the search key 12355 (86a) is associated with pointer "5" (86b) indicating the address of the data record identified by this search key in the data file 81. Put differently the data record that is identified by search key "12355" (57 in FIG. 3) is the fifth in order in data file 81.

The tables "ACCOUNT" and "DEPOSIT" are likewise arranged in two separate tries tree indexing files, respectively.

The $B^+$ tree indexing file of FIG. 4 exhibits one of the significant shortcomings of this approach in that the keys (i.e. search keys) are duplicated, i.e. they are held both in the interim nodes and in the data file associated with the leaves of the $B^+$ tree indexing file. Thus, for example, the search key of data record 57 is not only held as an integral part of the data record in file 81 but also in block 80a (search key 82a) and in block 80b (search key 86a).

This being the case, one readily notices that for large files (which is the case in many real-life scenarios) the duplication of the search keys (and particularly where n-long-key for large n is concerned) results in inflated indexing file(s) which necessitate a large storage volume.

Figure 5:
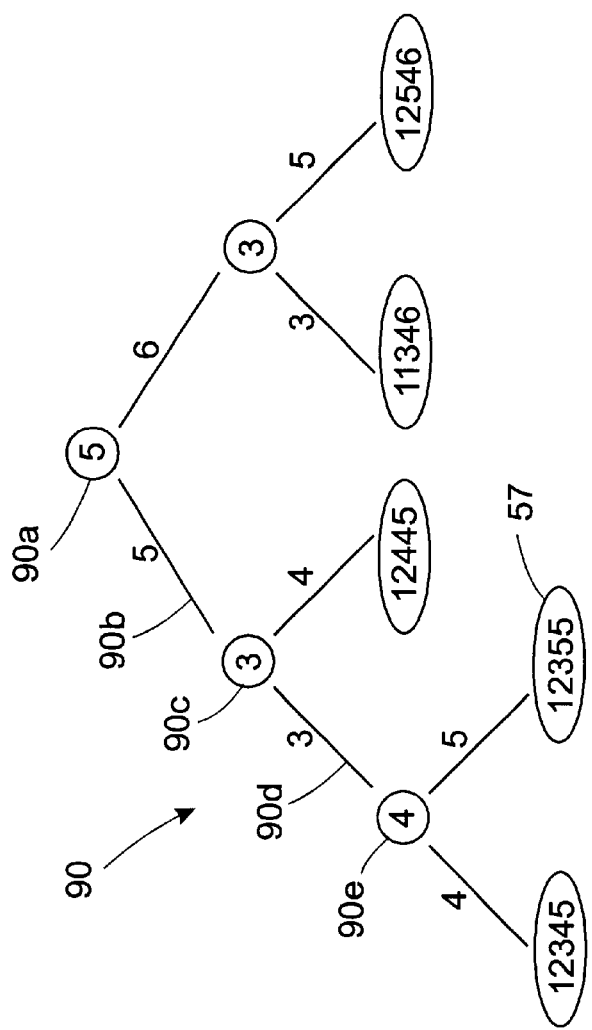
FIG. 5 shows an underlying indexing file structure of the "CLIENT" table of FIG. 3, in accordance with file management system employing conventional tries indexing file technique.

FIG. 5 illustrates an underlying indexing file structure of the "CLIENT" table of FIG. 3, in accordance with a file management system employing the conventional tries indexing file technique. Thus, tries indexing file 90 consists of plurality of nodes and links wherein each node stands for a position and the link stands for a value at this position. Table 91 has four columns. The first column indicates which digit position is to be used, the second column the value of that digit. A digit value partitions the key into two subsets. Column three and four direct the search procedure to the next step.

In order to locate a given search key, e.g. 12355, a digit at the position indicated by the root (position "5" indicated by node 90a, being also the first column in the first line of table 91) is compared to the value specified at the second column of the same line (value "5" indicated also by link 90b in the tries structure). Since the digit at position 5 of the sought search key 12355 is indeed 5, control is transferred to line 2 (as indicated by the third column of line 1 of table 91). Next, the digit at position 3 of the sought search key (90c in the tree, being also the value of the first column of the second line in table 91) is compared to the value 3 (link 90d, being also the second column in the second line of the table 91). Since match occurs, control is transferred to line 3 in the table. In this step the digit at position 4 of the sought search key does not match the value specified at the second column of line three (i.e. "5" vs. "4") and accordingly as indicated in the fourth column of table 91 ("not equal") a pointer to the sought data record (57) is obtained.

The tables "ACCOUNT" and "DEPOSIT" are likewise arranged in two separate tries indexing files, respectively. In contrast to the $B^+$ tree indexing file of FIG. 4, the one shown FIG. 5 does not necessitate duplication of the search key. Put differently, only one instance of each search key is held, as a whole, in the tries indexing file. In this sense it constitutes an advantage over the $B^+$ technique.

However, and as specified above, in order to retain an essentially balanced tree prior knowledge of the database contents is required. This requirement poses undue constraint since databases of the kind described in FIG. 2 are of a dynamic nature, e.g. for the specific database of FIG. 2, new clients open accounts, senior clients close accounts, new clients are registered as co-owners of existing accounts etc. Each of these transactions, when applied to the conventional tries indexing file may require substantive rearrangement of the tries structure (which is obviously undesired) in order to retain the "balanced tree" characteristics.

Having shown the file indexing structure according to two hitherto known techniques, attention is now directed to FIGS. 6A–6C showing a succession of underlying indexing file structures of the "CLIENT" table of FIG. 3, in accordance with the file management system employing the PAIF of the invention. The terms "transaction" and "operation" are used interchangeably.

In the description below the basic commands which enable data manipulation in the PAIF will be reviewed, i.e. insert new data record to an PAIF, find data record in PAIF, and delete existing data record. Those versed in the art will no doubt appreciate that on the basis of these basic primitives more compound data manipulation operations, (e.g. "Join") may be realized.

Turning at the onset to FIG. 6a, there is shown the Client's data record 103 (56 in table Client of FIG. 3) having search key "12345" (i.e. a 5-long-digit search key). The PAIF of FIG. 6a (100) is, of course, trivial and consists of a single node 101 (standing for both the root node and the leaf node) linked by means of a long link 102 to data record 103.

The node 100 represents an offset 0 in said search key and the link 102 represents a value "1" of the search key portion (being by this particular embodiment 1-digit-long) at the specified offset.

As clearly shown in FIG. 6a, the data record 103 is associated with a search path being a unit that consists of a node 101 and a link 102 which defines an offset and a pertinent search key portion value that conforms to the corresponding search key portion value at that particular offset within the search key of the specified data record. More specifically, the value of the one-digit search-key-portion at offset 0 within search key "12345" is indeed "1".

Turning now to FIG. 6b there is shown a PAIF 108 after the termination of a successive transaction in which the data record having Client_Id_No "12445" 107 has been inserted (data occurrence 58 in table Client of FIG. 3). The search keys of data records 103 and 107 are distinguished only in the third digit (offset 2), i.e. "3" and "4" respectively.

The unit defined by root node 101 and the link 102 is not sufficient to discern between data records 103 and 107, since the value of the 1-digit search key portion at offset 0 for both data records is "1". Hence, node 104 indicates the lowest offset which distinguishes between the two records and short links 105 and 106 indicate on the respective 1-digit search key portion "3" and "4" at offset 2.

Before moving on to describe a procedure of inserting a new data record to an existing database it should be borne in mind that the higher the node in the PAIF the smaller is the offset indicated thereby (e.g. in the PAIF of FIG. 6B, node 101 is higher than mode 104 and accordingly it is assigned with smaller offset-"0" vs. "2").

Generally speaking, the preferred procedure for inserting a new data record into an existing PAIF includes the execution of the following steps:

i. advancing along a reference path commencing from the root node and ending at a data record associated to a leaf node (referred to as "reference data record");

ii. comparing the search key of the reference data record to that of the new data record for determining the smallest offset of the search key portion that discerns the two (hereinafter discerning offset).

iii. proceed to one of the following steps (ii.0–iii.3) depending upon the value of the discerning offset:

iii.0 if the data records are equal then terminate; or iii.1 if the discerning offset matches the offset indicated by one of the nodes in the reference path, add another link originating from said one node and assign to said link the value of the search key portion at the discerning offset taken from the search key of the new data record; or iii.2 if the discerning offset is larger than that indicated by the leaf node that is linked, by means of a link, to the reference data record:

iii.2.1 disconnect the link from the reference data record (i.e. it remains temporarily "loose") and move the link to a new node; the new node is assigned with a value of the discerning offset;

iii.2.2 connect the reference data record to the new node (which now becomes a leaf node) and assign to the link (long link) a value of the search-key-portion at the discerning offset taken from the search key of the reference data record;

iii.2.3 connect by means of a link the new data record to the new node and assign to the link (long link) a value of the search-key-portion at the discerning offset taken from the search key of the new data record; or iii.3 if conditions iii.0, iii.1 and iii.2 are not met, there exists, in the reference search path, a father node and a child node thereof such that the discerning offset is, at the same time, larger than the offset assigned to the father node and smaller than the offset assigned to the child node. Accordingly, apply the following sub-steps:

iii.3.1 disconnect the link from the father node to the child node and shift the link to a new interim node (i.e. the child node remains temporarily "loose"); The new interim node is assigned with the value of said discerning offset;

iii.3.2 connect by means of a link (short link) the new data record to said new interim node; the value assigned to the link is that of the search-key-portion at the discerning offset, as taken from the search key of the new data record;

iii.3.3 connect by means of a new link the new interim node to the child node (i.e. the new interim node becomes a new father node thereof), and the value assigned to said link is the search-key-portion at the offset indicated by the new father node, taken from the search key of the reference data record.

It should be noted that for a different reference path a different PAIF may be obtained.

For a better understanding, the aforementioned "insert data record" operation will be successively applied to the specific PAIF of FIG. 6B, each time with a different data record so as to exemplify the three distinct scenarios stipulated in steps iii.1–iii.3, above, thereby resulting in three PAIF illustrated in FIGS. 6C-1 to 6C-3, respectively.

In the first example the CLIENT data record having Client_Id (or search key) "12546" (59 in table Client of FIG. 3) is inserted to the PAIF of FIG. 6B. As stipulated in step (i) we move along the reference path commencing from the root 101 to node 104 (see 'Find data record' defined below) and from there, the ('Not Found' state) by an arbitrary path that ends, for example, at data record 103 which stands for the "reference data record". The comparison operation stipulated in step (ii) results in that the search key of the new data record in distinguished from the search key of the reference data record at offsets 2 ("5" vs. "3") and 4 ("6" vs. "5"). The smallest offset ("discerning offset") is therefore 2.

Turning now to step (iii), the condition of step iii.1 is met since the discerning offset is equal to that assigned to node 104. Accordingly, and as is shown in FIG. 6C-1, new link 111 connects node 104 to the new data record 112. The value assigned to link 111 is 5, being the digit at location 2 in the search key of the new data record 112. PAIF 110 of FIG. 6C-1 is therefore the result of inserting the data record 112 into the PAIF 108 of FIG. 6B.

Moving now to the second example, the CLIENT data record having Client_Id (or search key) "12355" (57 in table Client of FIG. 3) is inserted into the PAIF of FIG. 6B. Steps i and ii, stipulated above result for the same reference path in the discerning offset 3 (since the only distinction between the search key of the new data record and that of record 103 is in the digit at location 3 - "5" vs. "4").

Turning now to step (iii), the condition of step iii.2 is met since the discerning offset 3 is larger than the offset 2 of leaf node 104 in the reference search path. Accordingly, in compliance with step iii.2.1 and as is shown in the resulting PAIF 120 of FIG. 6C-2, the link 106 is disconnected from reference data record 103 and is connected to a new node 121. The new node is assigned with the discerning offset 3. Next, in compliance with step iii.2.2, the reference data record 103 is connected to the new node 121 by means of new link 122. The new link is assigned with the value 4 (being the digit at the discerning offset 3 taken from the search key "12345" of the reference data record 103); and finally, as stipulated in step iii.2.3, the new data record 123 is connected to node 121 by means of link 124 which is assigned with the value "5" (being the digit at the discerning offset 3 taken from the search key "12355" of the new data record 123). PAIF 120 of FIG. 6C-2 is, therefore, the result of inserting the data record 123 into the PAIF 108 of FIG. 6B.

The third and last example concerns inserting the CLIENT data record having Client_Id (or search key) "11346" (55 in table Client of FIG. 3) into the PAIF of FIG. 6B. Applying the aforementioned steps i and ii result in discerning offset 1.

Thus in step iii, the condition of step iii.3 is met. Accordingly, in compliance with step iii.3.1 and as is shown in the resulting PAIF 130 of FIG. 6C-3, the link 102 is shifted to a new interim node 131. The new interim node 131 is assigned with the value 1 (being the discerning offset). As stipulated in step iii.3.2, the new data record 132 is directly connected by means of new link 133 to node 131; the value assigned to link 133 is 1 (being the digit at the discerning offset 1 taken from the search key "11346" of the new data record 132), and finally, in compliance with step iii.3.3 the new interim node 131 is linked to node 104 by means of link 134 assigned with the value 2 ((being the digit at the discerning offset (1) taken from the search key "12345" of the reference data record 103).

Although the PAIF described above with reference to FIG. 6A–6C may be accommodated within one block it is nevertheless preferable to separate between "nodes" and "data records" such that data records are grouped in a distinct file or files. Applying this approach to the PAIF of FIG. 6C-3, results in the generation of the data record file holding the records 103, 107 and 132. Links 106, 105, and 133 become, of course, long links.

Obviously, if an insert procedure results in finding that the data record to be inserted already exists in the PAIF an appropriate error message is returned to the procedure that invoked the Insert command.

It should be noted that in the latter examples it is assumed that the entire PAIF resides in a single block. Obviously when additional data records are inserted by following the foregoing "insert procedure" a block overflow may occur, which necessitates invoking "split block" procedure as described below.

Having described a typical "Insert" operation, a "Find (or Retrieve) data record" procedure will be now described. Thus, for finding a data record having a given search key (hereinafter the sought data record) in an existing PAIF, the following steps should be executed:

i. advance along a search path commencing from the root node and ending at a data record linked to a leaf node, and for each node in the search path (hereinafter "current node") perform the following sub-steps:

i.1 for each link originated from the current node: compare the search-key-portion of the sought data record at the offset defined by the current node to a search-key-portion value assigned to said link; in case of a match advance along said link and return to step i;

i.2 if none of the links originated from the current node matches the search-key-portion of the sought data record, return "NOT FOUND" and terminate the find procedure;

i.3 if a data record is reached (hereinafter "reference data record"), compare the search key of the sought data record as a whole, to that of the reference data record;

i.3.1 in case of a match, return "FOUND" (and in case of "Retrieve", return also the entire data record) and terminate the find procedure; or i.3.2 in the case of mismatch return "NOT FOUND" and terminate the find procedure.

For a better understanding the "find" procedure will be applied, twice, to the specific PAIF of FIG. 6C-3 giving rise to "found" and "not found", results respectively.

Thus, consider a find data record having search key "12445" (herein after sought data record). According to step i.1 the value of the digit "1" at the offset assigned to the root node (offset 0) of the sought data record is compared to the one assigned to link 102 (being the sole link originated from node 101). Since a match is found, control is shifted to node 131. Again according to step i.1 the value of the digit ("2") at the offset assigned to node 131 (offset 1) of the sought data record is compared to the one assigned to link 134 (being the sole link originated from node 101). Here also a match is found so control is shifted to node 104. Next, according to step i.1, the value of the digit "4" at the offset assigned to node 104 (offset 2) of the sought data record is compared for each link originating from mode 104. The comparison results in a match for link 105 and accordingly control is shifted to data record 107.

According to step i.3 the search key of the sought data record and that of data record 107 are compared and since a match is found a "FOUND" result is returned (step i.3.1).

Turning now to a second example, consider the case when the sought data record has a search key "12463". The procedure described with reference to the previous example is repeated, however at step i.3 the comparison between the sought data record and data record 107 results in a mismatch, and according to step i.3.2 a "NOT FOUND" result is returned.

A general "Delete Data Record" procedure will now be described. Thus, as a first stage a "Find data record" procedure is applied to the PAIF. In case of "NO FOUND", an appropriate error message is returned to the procedure that invoked the "Delete" command. Alternatively, the sought data record is found. For clarity of explanation of the "Delete" procedure, the following nomenclatures are introduced:

The leaf node that is linked to the sought data record is referred to as the "target node". The father of the target node is referred to as the "predecessor target node". The link that connects the predecessor target node to the target node is referred to as the "predecessor link" and the link that connects the target node to a child node thereof (or to a data record other than the sought data record) is referred to as the "target link". Bearing this nomenclature in mind, the following steps are executed:

i. delete the sought data record and the link that links the target node thereto;

ii. if the number of links that remain in the target node is larger than or equal to 2, then the deletion procedure terminates;

iii. if, on the other hand, the number of links that remain in the target node is exactly one (i.e. one target link), then:

iii.1 "bypass" the target node by connecting the predecessor link from the predecessor node to said child node (or to a data record); and iii.2 delete the target node and the target link; terminating the deletion procedure. It should be noted that the current step is more of "prudent memory management" step in order to release the space occupied by the target node and link, so as to enable allocation thereof to other nodes and links in the block.

For a better understanding the foregoing "delete data record" procedure will be applied to the specific PAIF of FIG. 6C-3.

Thus, responsive to a command "delete record having search key="11346", the latter record is searched in the PAIF according to the procedure described above. Having found the data record 132 and in compliance with step i above, the data record as well as the link 133 leading thereto are both deleted. Since after the latter deleting step, the target node 131 remains only with the sole target link 134, step iii and iii.1 apply, and accordingly the predecessor link 102 bypasses target node 131 and is directly linked to the child node thereof 104. Next, in compliance with step ii.2, target node 131 and the target link 134 are deleted thereby obtaining the PAIF shown in FIG. 6B.

Another Example is given with reference to the PAIF of FIG. 6C-1. Thus, responsive to a command "delete record having search key="12546", the latter record is searched in the PAIF according to the procedure described above. Having found the data record 112 and in compliance with step i above, the data record as well as the link (111) leading thereto are both deleted. Since, as stipulated in step ii, the number of links that remain in the target node 104 is two (i.e. links 105 and 106), then the deletion procedure terminates. The resulting PAIF is again the one shown in FIG. 6B.

Another common primitive is the "Modify existing data record", e.g. change the address of an existing client. The "Modify" primitive is normally realized by selectively utilizing the aforementioned primitives. For executing a "Modify" command one should distinguish between the following cases:

1. The "modify" applies to fields other than the search key (e.g. modify the address of a client having Client_Id_ No="xxxxx") - in this case the modify procedure simply involves a "Find" operation (data record having Client_Id_No="xxxxx"). Having found the sought data record, the old address is replaced by a new one.
2. The "modify" applies to a search key field (e.g. change an account no. from "xxxxxx" to "yyyyyy"). This command is realized as a sequence of two other primitives, i.e. delete data record having "Account_No"="xxxxxx" and thereafter insert data record having "Account_No"="yyyyyy", or vice versa. Obviously a Modify transaction may consist of both cases.

In the previous examples each search key is represented as a series of digits and accordingly the search procedure is performed by partitioning the search-key into search key portions each consisting of at least one digit.

Those versed in the art will readily appreciate that digits are not the only possible representation of a search key. Thus, for example, a search key can be represented in binary form, i.e. a series of 1's and 0's and accordingly the search procedure is performed by partitioning the search-key into search key portions each consisting of one bit (i.e. 1=1), one byte (i.e. 1=8 bits) and others. In certain scenarios, it may well be the case that the I value is not identical for all the nodes in the PAIF.

It should be further noted that different links in a given PAIF may be assigned with search-key-portions of different length.

As is clearly evident from the various PAIF of FIGS. 6*a*–6*c*, the data records can be accessed in a sorted form according to search key. Scanning, for example, the PAIF of FIG. 63-C (from left to right) brings about the ordered series "11346", "12345" and "12445". This characteristics constitutes yet another advantage which ease data manipulation. As specified before, a node in the PAIF is not necessarily classified uniquely. Thus, for example, in the PAIF 120 of FIG. 6C-2, node 104 is at the same time a leaf node (linked, by means of a long link 105 to data record 107) and an interim node (linked by means of a short link 106 to node 121).

Those versed in the art will readily understand that the "Insert", "Delete" "Find" and "Modify" procedures described herein are only one out of many possible variants for realizing these procedures and they may be modified, all as required and appropriate depending upon the particular application.

Figure 7B:
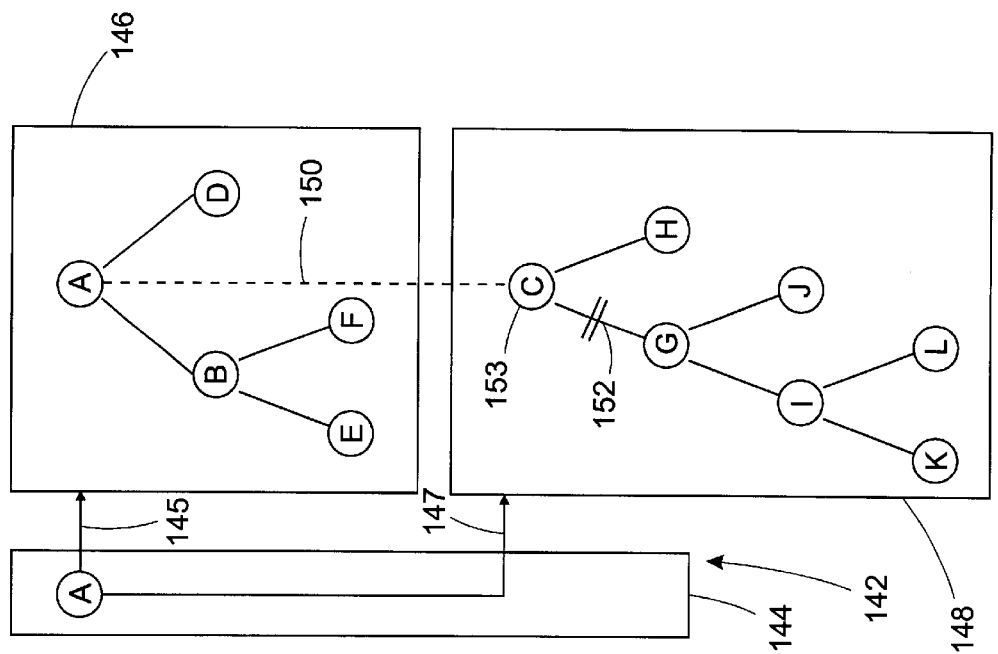
Figure 7A:
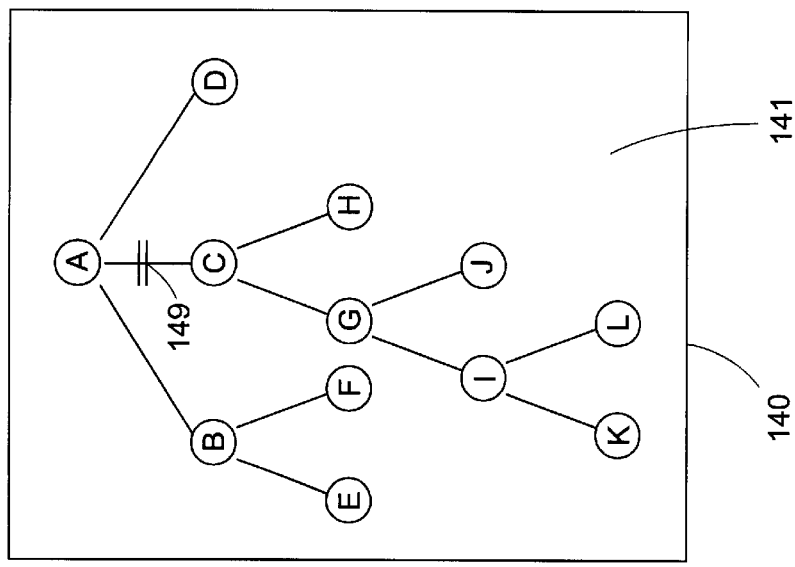

Turning now to FIG. 7A–C, there are shown schematic illustrations exemplifying succession of split block operations, according to one embodiment of the invention. Consider for example a block 140 which is unable to accommodate (in terms of memory space) the sub-PAIF 141. This being the case a "split block" procedure is invoked which results in the block tree structure 142 consisting of root block 144 linked to leaf block 146 by means of direct link 145 (as opposed to "short link" and "long link" specified above) and by means of long link 147 to a leaf block 148. By this specific example, the split point was selected to be link 149 (hereinafter "split link") thereby shifting nodes A, B, E D and F to new block 146 and nodes C, G, I, J, K, L and H to a new block 148. The split link is preferably selected in order to accomplish an essentially even distribution of nodes and links between the new blocks (e.g. the size of the sub PAIFs that resides in blocks 148 and 146 is essentially the same). The node from which the split link is originated is normally duplicated and reside in the father block (144) and the connection between this node and the replicated copy thereof in block 146 is implemented by means of said direct link. The link 149 (being originally a short link) is replaced by long link 147. Optionally node A and C may also be linked by means of another long link marked as dashed line 150.

If, for sake of discussion, the sub PAIF cannot be accommodated in block 148 it undergoes similar block split procedure resulting in block tree structure 151 in FIG. 7C. By this example the split link is short link 152 and accordingly nodes G, I, J, K and L are arranged in a new leaf block and node C is copied to the father block 144. The node from which the split link originates (node C-153) is replicated (yielding an additional node 153*a*) and placed both in blocks 140 and 148A. As before, nodes 153 and 153*a* are linked by means of direct link (154). As is clearly seen in FIGS. 7B and 7C split block procedure results in a balanced tree of blocks thereby keeping the tree depth to a minimum and consequently minimizing the number of I/O operations that are required in order to find, insert or delete a given data record.

The resulting structure does not adversely affect the characteristics of the general purpose PAIF described above. Thus, for example, reverting to block 140 (FIG. 7A) it is readily seen that the search path to node L consists of the following nodes A, C, G, I and L. As shown in FIG. 7C, the counterpart search path being A, C (block 140), G, I and L (block 148B). By another example the search path to node H consists of nodes A, C and H in block 140 whereas the counterpart search path in FIG. 7C being A, C, C, and H bringing about only limited overhead (i.e. "C, C" in the latter search path vs. "C" in the former search path). The replicated node and its associated direct pointer are added for the purpose of managing efficiently a PAIF which extends to plurality of blocks, and are therefore not deemed as selected nodes m the sense defined above. Put differently, by this particular embodiment the number of selected nodes in the PAIF do not match the total number of nodes in the PAIF.

The opposite procedure "Delete block" is activated when a data record is deleted leaving only one node in a block having no data records associated therewith.

Those versed in the art will readily understand that the "split block" procedure described herein is only one out of many possible variants for realize the "split block" procedure, so as to retain the PAIF characteristics and accomplish an essentially balanced tree of blocks.

As discussed in detail above, a database management system that exploits file management system based on conventional tries structure offers advantages in terms of reduced file size as compared to counterpart systems that utilize, for example, commercially available B+ tree indexing files. These advantages stem predominantly from the partitioning of the search according to search key portions. Since a file management system that employs the PAIF of the invention also utilizes partitioning the search according to search key portions, it likewise benefits from the same advantages.

However, and as discussed in detail in the foregoing, the conventional tries indexing file only purports to offer an improved solution since it poses undue constraints such as the requirement of prior knowledge on the contents of the database, and others. These constraints render a solution based on conventional tries indexing file practically infeasible from commercial standpoint.

Whilst the description in FIGS. 7a–7c exemplifies a split-block procedure in order to retain an essentially balanced tree of blocks in respect of a PAIF of the invention, those versed in the art will readily appreciate that the so described technique is not bound to PAIF structure of the invention. For example, U.S. Pat. No. 5,495,609 illustrates a digital tree structure of index nodes. Consider, for example, the digital tree structure of FIG. 1 in the specified '609, and assuming that the digital tree consists of a block that accommodates nodes 11, 12, 13 and 14. Should it now be required to split the block subsequent to the insertion of new nodes to the tree, a possible approach of splitting the block in accordance with prior art techniques, would be, for example, to break the link between node 12 and 14, to thereby obtain two blocks, one accommodating nodes 11, 12 and 13, whereas the other accommodating node 14. If, for example, it is now required to reach record 26, only one I/O operation is required. If, on the other hand, record 20 is of interest, a first I/O operation is required, in order to access the new block (i.e. the one accommodating node 14), and therefrom another (i.e. second) I/O operation is required, in order to access record 20. It is accordingly appreciated that the split block gave rise to an unbalanced tree. Subsequent insert transactions may adversely affect the unbalanced characteristic of the tree, which is obviously undesired.

Figure 7D:
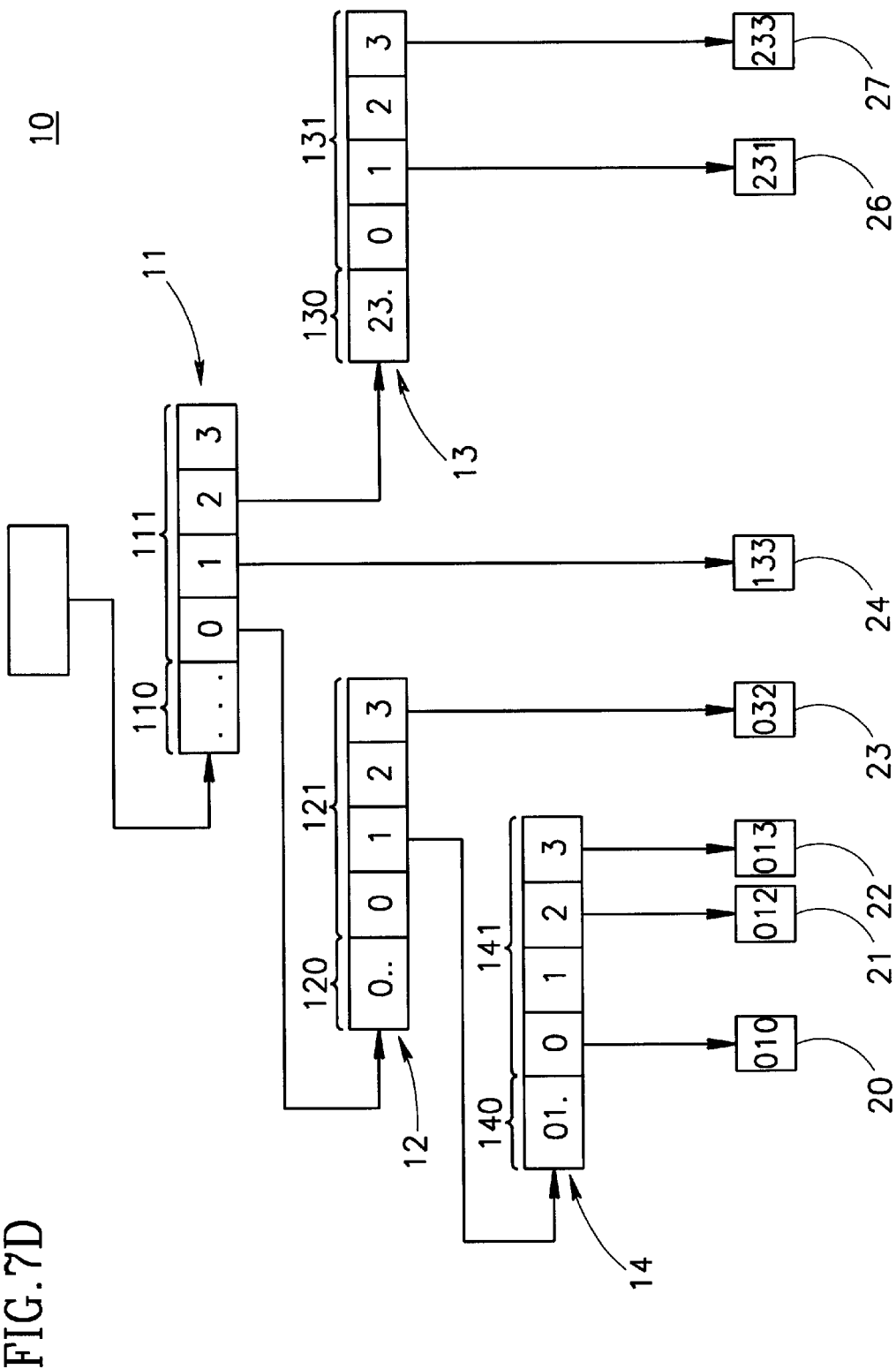
FIGS. 7D–E show a digital tree structure according to the prior art before and after applying the split block technique of the invention.
Figure 7E:
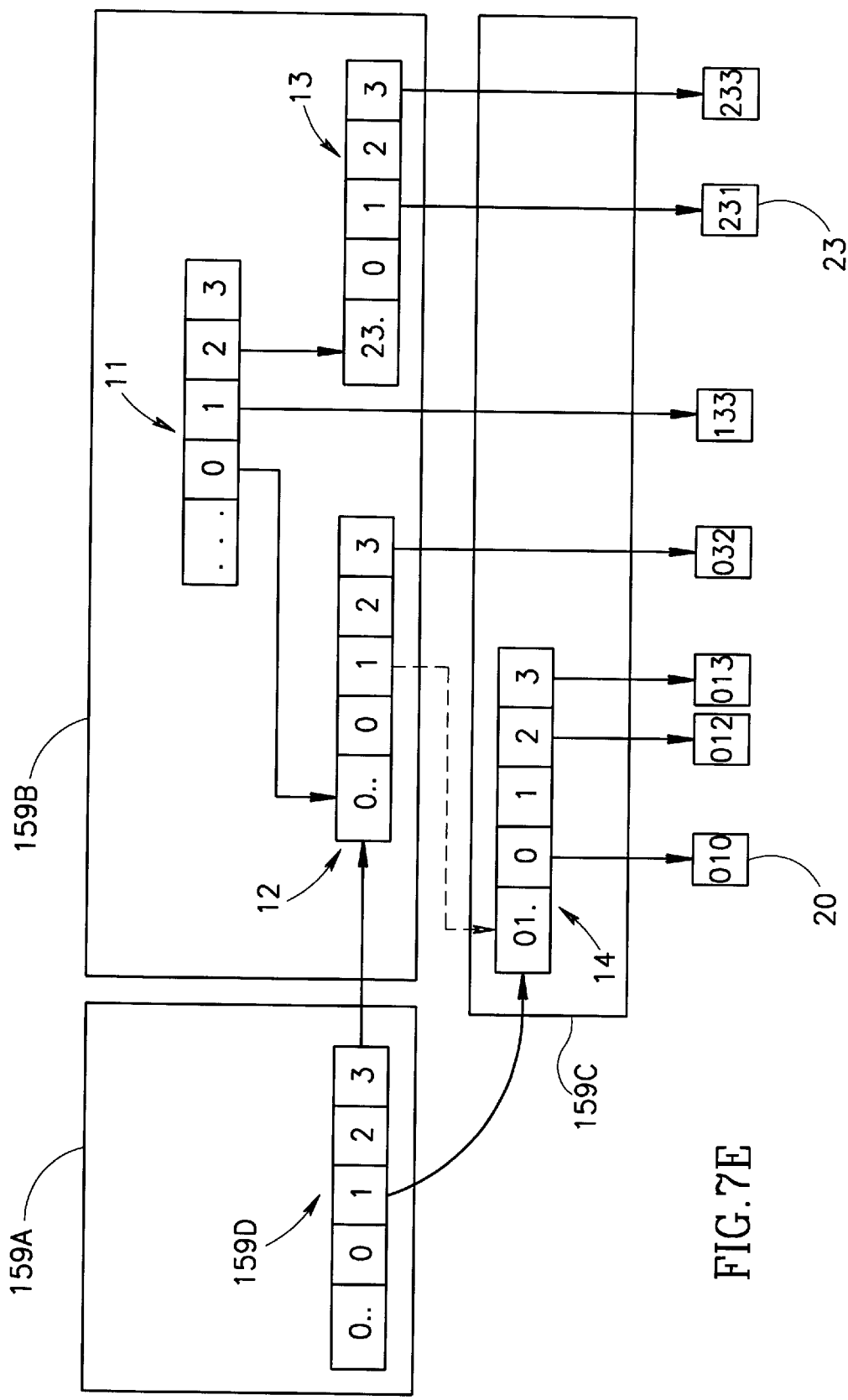

Applying the technique of the invention will cope with the shortcomings of an unbalanced tree, and the resulting tree is illustrated in FIG. 7e. Here also, the link between node 12 and 14 was broken for the purpose of splitting the blocks, and new node, 159D, is inserted into a new block designated as 159A. Now, in order to access record 20 and record 26, the same number of I/O operations is required, and in this particular case, 2.

The split block technique of the invention brings about, thus, an essentially balanced tree of blocks, assuring that essentially the same number of I/O operations is required to reach each and every data record in the tree. Those versed in the art will readily appreciate that the number of I/O operations is a function of the block size and node size.

As recalled, in the PAIF of the invention, the node size is very small, since it does not contain, as a rule, a portion of the search key itself, whereas according to the tree of the '609 patent, each node accommodates also a part of the search key.

The digital tree structure with which the split block technique of the invention is of concern, is not confined to that disclosed in the '609 patent, and it may encompass other types of trees, e.g. the PAIF of the invention.

All digital tree structures with which the split block technique of the invention is of concern, retains a so-called search path characteristics in the sense that the same algorithm that was used for accessing a given data record before the block split, is also applicable after the block split.

The retention of the search path characteristics is also valid for the digital tree structure example, as depicted in FIGS. 7d and 7e. Put differently, the same data record search algorithm that was used in a digital tree structure before being subject to block split is used after the application of the block split in the manner specified. It should be noted that the manner of splitting block is, of course, not confined to those shown in FIGS. 7a and 7e.

A database file management system of the invention not only copes with the drawbacks of the conventional tries indexing file but also offers other benefits which facilitate and improve data access by user application programs.

Thus, the fact that an essentially balanced tree of blocks is retained assures that, on the average, the number of slow I/O operations is retained essentially optimal.

It should be emphasized that whilst according to the PAIF of the invention an essentially balanced tree of blocks is retained, the latter characteristics do not necessarily apply to the sub-probabilistic accesses indexing file (sub PAIF) structure accommodated within a given block. Put differently, within a given block that is loaded to the memory the sub PAIF may be unbalanced (as exhibited for example by the PAIF 120 of FIG. 6C-2, wherein the depth of data record 107 is two and the depth of data records 103 and 123 is three).

Whilst the fact that a sub-PAIF that resides within a block may be unbalanced is seemingly a drawback, those versed in the art will readily appreciate that its implications on the overall database performance are virtually insignificant, since the search operations performed on the unbalanced sub-PAIF are all executed within a block i.e. in the fast internal memory of the computer system. As opposed to the intra-block structure, which may optionally be unbalanced, the arrangement of a block within a tree is retained essentially balanced thereby minimizing, on the average, the number of I/O accesses to the external memory (an operation which is inherently slow) in order to load a desired block to the internal memory.

As is clearly evident from the examples in FIGS. 6a–6c an PAIF of the invention may be constructed incrementally and in contrast to conventional Tries indexing file, no prior knowledge of the database contents (i.e. the data records) is needed.

A further advantage brought about by utilizing the database file management system of the invention is that data is inherently held in a sorted form according to search key. The latter characteristic stems from the fact that for any given node in the PAIF, the series of search key portions (that are defined by the search path commencing at the root node and ending at said given node) appear at each one of the search keys of the data records (and at the same offsets) that are associated with the leaf nodes that are subordinated to said given node.

For a better understanding of the foregoing, attention is drawn to FIG. 6C-2. Focusing for example on node 104, the pertinent search path includes node 101 and link 102 signifying a value "1" at offset 0. As expected, all the data records that are subordinated to node 104, i.e. data records 107, 123 and 103 meet this provision, or in other words the value of the digit at offset 0 in each one of the search keys of specified data records is indeed "1".

Focusing, for example, on node 121, the pertinent search path includes node 101, link 102, node 104 and link 103, signifying a value "1" at offset 0 and value "3" at offset 2. As expected, all the data records that are subordinated to node 121, i.e. data records 123 and 103 meet this provision, or in other word the value of the digit at offset 0 in both records is indeed "1" and likewise the value of the digit at offset 2 in both records is indeed "3". In contrast, data record 107, which is not subordinated to node 121 does not comply with the latter provision, since the value of the digit at offset 2 thereof is "4".

Accordingly, data records having "neighboring" search keys reside in the same cluster of the PAIF. The latter characteristics facilitates access to data by user application programs.

As specified in a PAIF of the invention each interim node holds only a portion of a search key whereas in commercially available file management systems based for example on $B^+$ tree indexing file arrangement, an interim node holds two or more search keys in their entirety. Hence, the memory space that should be allocated for holding an interim node in a PAIF is significantly smaller than that required to hold a counterpart node in the $B^+$ tree indexing file. Based on the foregoing observation, it readily arises that a fixed size block that is loaded in the memory accommodates more PAIF interim nodes and their pertinent links than a counterpart block accommodating $B^+$ interim nodes. Accordingly the sum-total of blocks required to represent a given database in a file management system of the invention is smaller than the number of blocks required to represent the same database, based on $B^+$ tree indexing file. Bearing further in mind that the file management system of the invention assures an essentially balanced tree of blocks, the depth of the PAIF that is required to represent a given database is smaller than the counterpart indexing file according to $B^+$ technique.

Accordingly, a database file management system that utilizes an PAIF of the invention affords a reduced number of I/O operations, on the average, in order to access data, thereby further enhancing database performance.

Figure 8:
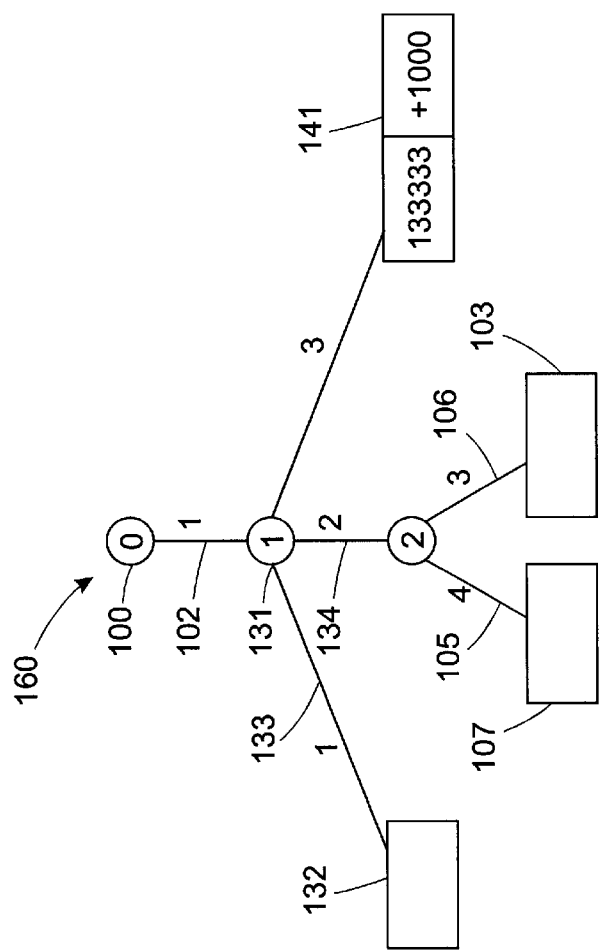
FIG. 8 shows a single PAIF of a database file management system of the invention, accommodating data records taken from both the CLIENT and ACCOUNT tables of the database shown in FIG. 3.

As stated before, the database file management system of the invention enables to hold different types of data in one PAIF. Thus, for example, data records that form instances of the CLIENT and ACCOUNT entities can both reside in the same PAIF. FIG. 8 illustrates a PAIF 160 consisting of the PAIF 130 of FIG. 6C-3, in which a data record (141) is inserted. The latter data record is taken from the ACCOUNT table (data record 65 of FIG. 3) and it has a key attribute-Account_No="133333" (constituting the search key). This data record, despite taken from a different entity, is inserted to the PAIF 160 by strictly following the above referred to insert procedure.

Preferably, in order to better distinguish between data records of different types that reside in the same PAIF each data record belonging to a given type can be prefixed with a unique symbol. Thus, for example, all the search keys of data records that belong to the entity "CLIENT" are prefixed with the symbol 'A' (standing for "data type ID"), whereas all the search keys of data records that belong to the entity "ACCOUNT" are prefixed with the symbol 'B'. The new search key of the data records that belong to CLIENT consists now of the concatenation of 'A' and the original search key, and by the same token, the new search key of the data records that belong to ACCOUNT consists now of the concatenation of 'B' and the original search key.

Figure 9:
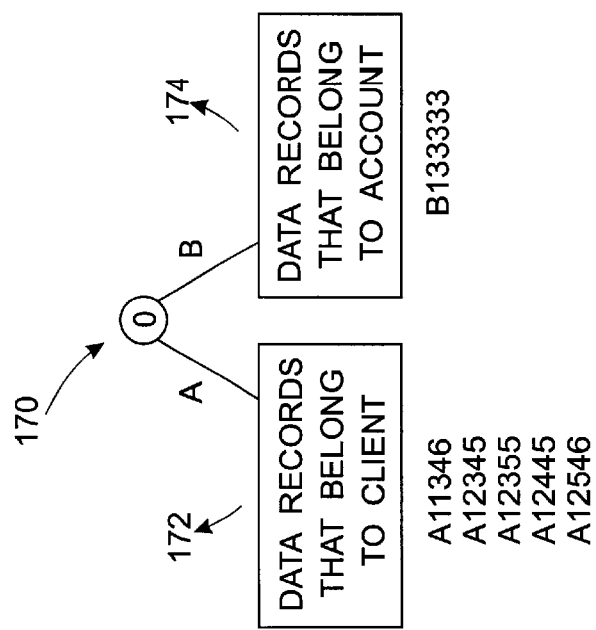
FIG. 9 shows a schematic illustration of a single PAIF utilized by a file management system according to another embodiment of the invention.

By following the latter approach all data records that belong to a given data type reside in a well defined "cluster" or sub PAIF within the PAIF. The resulting partitioning is illustrated schematically in an PAIF 170 shown in FIG. 9. Thus, the symbol 'A' and 'B' at offset 0 of the search key, inherently divide the data records into two distinct clusters, respectively, such that all data records belonging to the CLIENT entity reside in cluster 172 of the PAIF and all data records that belong to "ACCOUNT" reside in cluster 174 of the PAIF.

Thus, whilst according to hitherto known solutions, data of different types are typically held in different files, according to a database management system utilizing an PAIF, different data types may reside in the same file. Utilizing only one file is, typically (but not necessarily), advantageous over utilizing a plurality of files since it obviates the need to repeatedly invoking the relatively time consuming operating system services "open file" and "close file", and thereby improves the overall database response time. It also simplifies the memory management requirements, e.g. it enables the use a single cache memory for blocks of the entire system.

It should be noted that the search keys of data records that belong to different types (and reside in the same PAIF) do not necessarily have the same length. Thus, in the example of FIG. 9 all records that belong to the "CLIENT" entity have 5 digits, whereas the record 141 that belong to the "ACCOUNT" entity has 6 digit. This characteristic facilitates the application of the file management system of the invention to databases indicative of wide range of real-life scenarios.

In a similar manner, data records that belong to the relationship "DEPOSIT" may be also incorporated in the PAIF 160 of FIG. 8, e.g. data record 70 from the "DEPOSIT" table of FIG. 3. The pertinent search key consists of the concatenation of the search keys of "CLIENT" and "ACCOUNT", i.e. "11346133333" (being indicative of the fact that "CLIENT" 11346 has an account no. 133333). In order to distinguish data records that belong to "DEPOSIT" from those that belong to "ACCOUNT" and "CLIENT", the above tagging technique may be utilized, i.e. all data records that belong to the "DEPOSIT" table are prefixed with the symbol 'C' (as opposed to 'A' and 'B' used for "CLIENT" and "ACCOUNT", respectively). Accordingly, the specified search key is "C11346133333". As is well known to those versed in the art for the purpose of realizing efficient data manipulation it may be required, in certain scenarios, to view the specified record not as "a client having an account" but rather as "an account owned by a client". To this end the search-key of data records belonging to "DEPOSIT" may also be viewed as a concatenation of "ACCOUNT" and "CLIENT" (e.g. the search key of the same data record 70 is also "13333311346"). In order to distinguish this record from its counterpart in the relationship "DEPOSIT" it is prefixed with the symbol 'D', i.e. "D13333311346".

Figure 10:
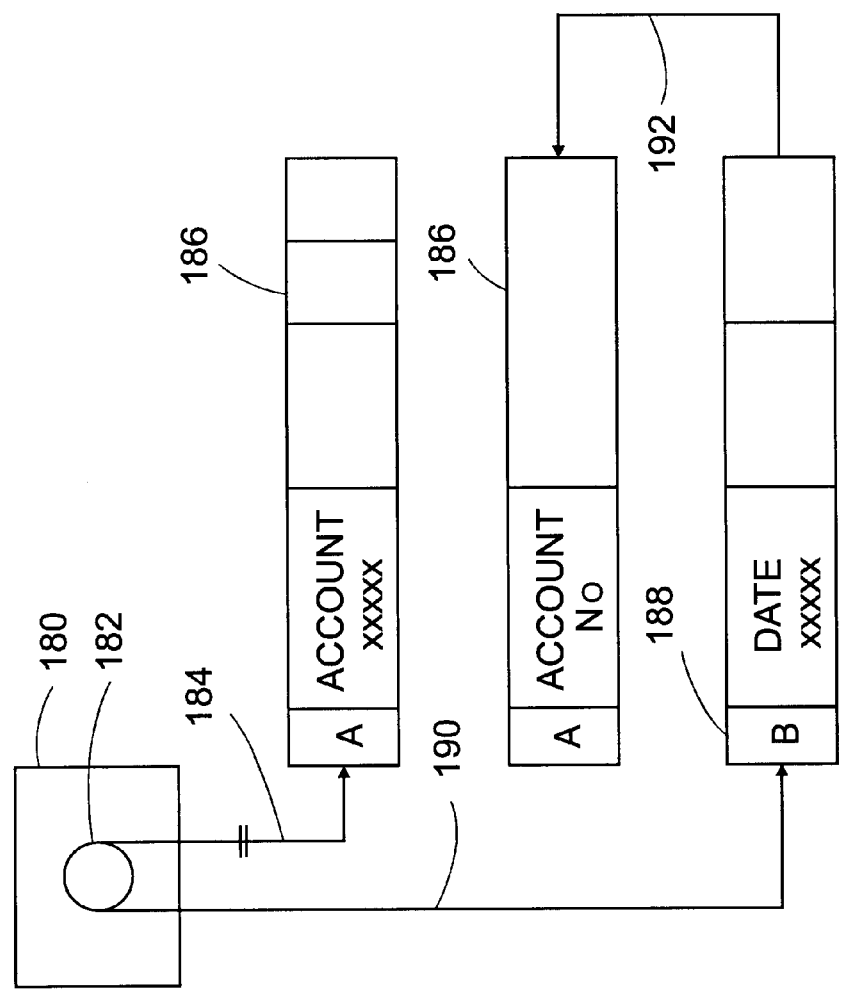
FIG. 10 shows a schematic illustration of a single PAIF utilized by a file management system according to yet another embodiment of the invention.

Storing both C11346133333 and D13333311346 in an PAIF is, obviously, undesired since they represent the same data occurrence (data record 70). One possible, yet not exclusive approach to cope with this limitation is to construct a PAIF of the kind shown in FIG. 10. Consider, for example, a PAIF 180 having a leaf node 182 pointing, by means of long link 184, to data link 186 having a search key 'Axxxx' (from the "Account" table) which is composed of a concatenation of the letter 'A' and the contents of the field "Account No.". Suppose that an account number has additional attributes e.g date (at which the account was opened) and others. The additional attributes are organized in a separate data record (188) having a search key that is composed of the concatenation of the letter 'B' and the contents of the field "date" ("yyyy"). As shown in FIG. 10, according to an alternative approach data record 188 is linked by means of a long link 190 and data record 186 is accessible by means of pointer 192. Put differently, the leaf node 182 is linked to link list which consists of records 188 and 186. It is important to note that data record 188, albeit having a search key "Byyyy" is connected to a node that forms part of a search path that is defined by the search key of data record 186, i.e. 'Axxxx'. This structure whilst seemingly not complying with the general definition of PAIF is nevertheless appropriate seeing that record 188 is meaningful only in conjunction with record 186 (in a sense it is subordinated thereto). More specifically the field "opening date" in record 188 is meaningless per se, however it gains meaning when viewed as the "opening date" of the account having "account number" as defined in record 186. Accordingly one could possibly refer to record 188 as having a search key composed of the concatenation of the search keys of records 186 and 188, i.e. "AxxxByyyy". Data record 186, whilst not directly linked to node 182, is associated thereto. The example of FIG. 10, illustrates a situation in which more than one data record is associated to a single node in a PAIF.

Figure 11A:
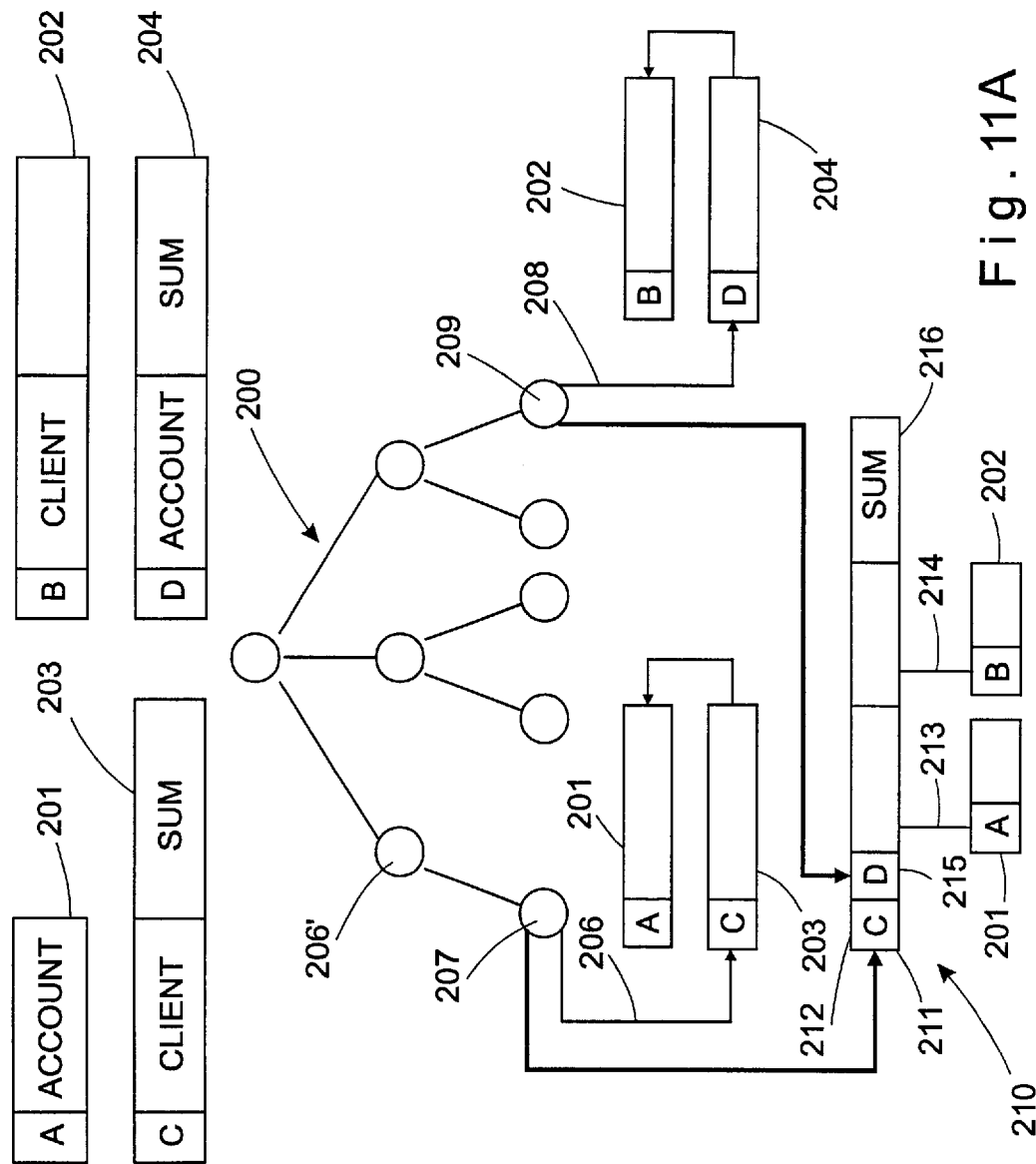
FIG. 11A shows a schematic illustration of a single PAIF utilized by a file management system according to still yet another embodiment of the invention.

Turning now to FIG. 11A, there is shown a schematic illustration of a single PAIF, according to one embodiment of the invention, utilized for representing the relationship "DEPOSIT". Reverting to the above example the specific Account data record has a search key 'A133333' (201) the specific Client has a data record 'B11346' (202). The fact that a given account number ("133333") is associated to a given Client ("11346") is represented as "C11346" (203). The latter data record is subordinated to data record 201 and therefore it is identified also by the search key of record 203. Put differently, one can refer to the search key of data record 203 as a concatenation of the search keys of data records 201 and 203, i.e. 'A133333C11346'.

By the same token, data record 204 represents an account of Client data record 202. The search path that leads to data record 204 is identified by concatenation of the search keys of data record 202, i.e. 'B11346' and that of data record 204, i.e. 'D133333'.

The resulting PAIF 200 includes data record 201 and 203 where the latter is linked by means of long pointer 206 to a node 207. As specified before, the search path that leads to node 207 corresponds to the search key of data record 201.

The resulting PAIF 200 further includes data record 202 and 204 where the latter is linked by means of long pointer 208 to a node 209. As specified before, the search path that leads to node 209 corresponds to the concatenation of the search keys of data records 202 and 204. As shown in PAIF 200, the Client and Account data records are duplicated which is an obvious drawback which results in an undue inflated file.

This drawback may be easily overcome by representing the DEPOSIT relationship as structure 210. Thus, data records 201 and 203 that are linked to node 207 by means of pointer 206 and data records 202 and 204 that are linked to node 209 by means of pointer 208, are represented as a single data structure 210.

As shown, the search path defined by the search keys of records 201 and 203 leads to the first field 212 having a value 'C'. The third field points to the actual data record 201. The second field 215 (having a value 'D') of the same data structure 210 is accessible by search path that is defined by the search key of record 202. The fourth field has a pointer that points to the actual data record 202. In this manner the relationship DEPOSIT is represented both as "a client having an account" and as an "account owned by a client", whilst avoiding duplication of the records, i.e. only one instance of the data records "client" and "account" is used for representing the relationship DEPOSIT. Field 216 illustrates an attribute of the DEPOSIT relationship, e.g. the balance of the account "133333" owned by Client "11346".

The PAIF is associated with additional table (not shown) that describes the relations, i.e. that 'C' (field 212) is indicative of an account record that is physically linked to field 213 and that the client that owns this record is physically linked to field 214. 'D' (field 215), in its turn, is indicative of a client record that is physically linked to field 214 and that client has an account record which is physically linked to field 213. Accordingly, there is only one occurrence of "Client" and "Account" in the PAIF. The search path that leads to field 212 ('C') corresponds, of course, to AxxxxByyyy, whereas the search path that leads to field 215 ('D') corresponds to ByyyyAxxxx. If the sought data record is Axxxx (i.e. the client record 201 per se), then one simply moves in the PAIF with a search key of 'Axxxx', in the manner specified above, and reaches a given node (e.g. node 206'). From here one could continue to any leaf subordinated thereto (by this particular example there is a sole subordinated leaf node (207)) and therefrom extract record 201 in the manner specified above, or if desired there may be a direct link from node 206' to data record 201. Other implementation are of course feasible, all as required and appropriate.

In a PAIF 200 according to this embodiment, a leaf node is associated with more than one data record (which by this particular embodiment is represented as a sole data structure 210). As shown, the PAIF 200 includes one physical occurrence of two data records (201 and 202), such that there are defined two search paths that lead to the same two data records.

Figure 11B:
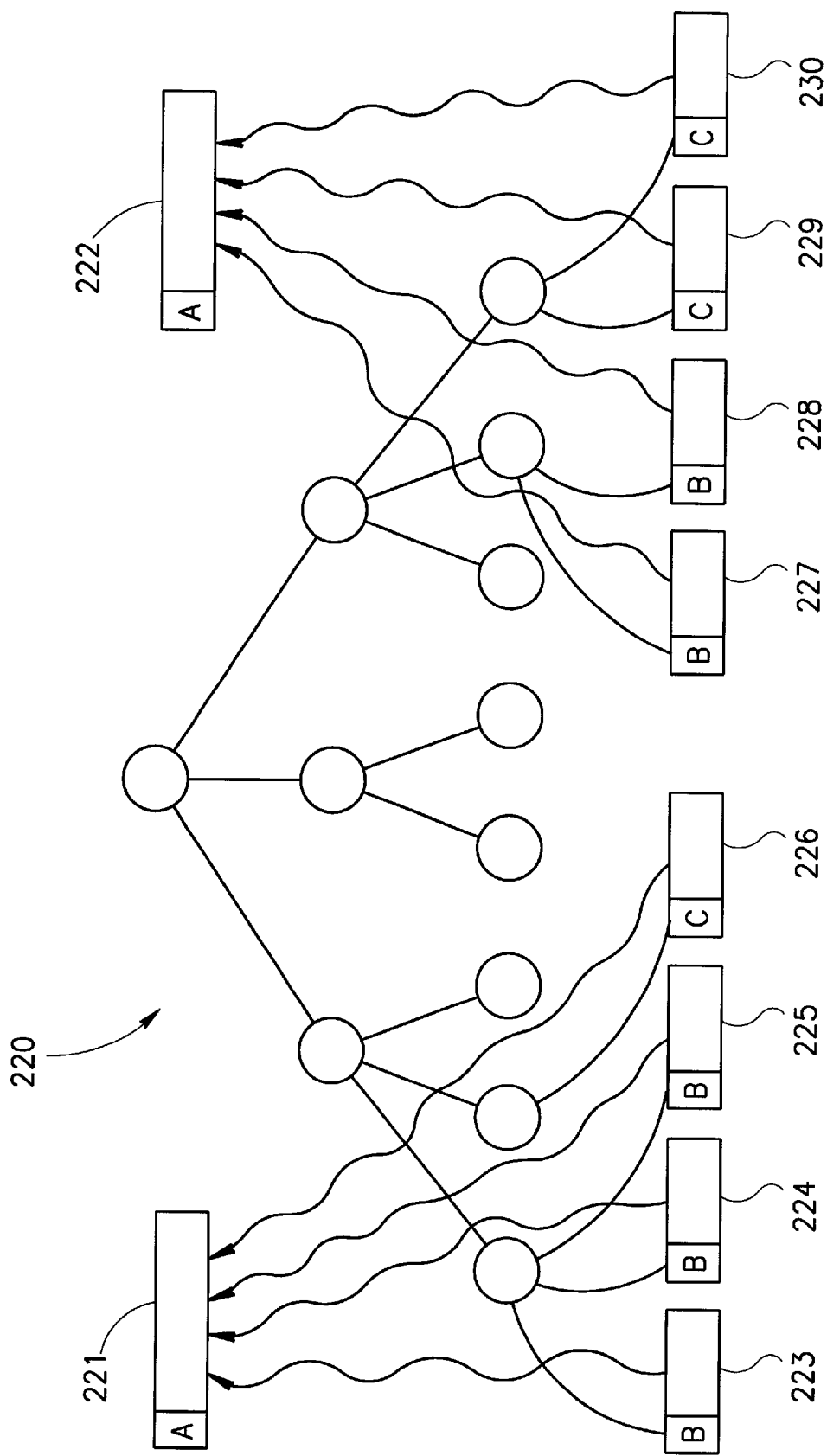
FIG. 11B shows a schematic illustration of a single PAIF utilized by a file management system, according to still yet another embodiment of the invention.

Attention is now directed to FIG. 11B showing another embodiment of a PAIF according to the invention. This schematic illustration of FIG. 11B exemplifies the ordered structure that is inherently incorporated in a PAIF of the invention. Thus, PAIF 220 represents three types of data records designated respectively as A, B, and C - where A may stand for e.g. a customer record, B may stand for e.g an order record, and C stands for e.g. a payment record. As clearly arises from the PAIF of the specific embodiment of FIG. 11B, there are two occurrences of customer records, (221 and 222). For the customer 221, there are three related orders, (223, 224 and 225), and one payment data record, (226). Customer record 222, in its tun, has two orders (227 and 228) and two payment data records (229 and 230). The example of FIG. 11B illustrates the inherent ordered structure that is manifested in a PAIF of the invention. Thus, the order data records are subordinated to the customer data records; the order data records and the payment data records are subordinated to the customer data record, thereby reflecting an ordered structure which is similar to a hierarchical data base. In other words, data records 223, 224, 225 and 226, are all subordinated to a given customer data record, 221. In a similar manner, data records 227, 228, 229 and 230 are all subordinated to data record 222, reflecting, again, the hierarchical structure.

The same PAIF may represent at the same time, a known relational ordered structure, where all the customer data records and their subordinated order records constitute a relational table. In the same manner, all the customer records and their subordinated payment records constitute another relational table. By this particular example, the first table includes data record 221 and its subordinated data records 223, 224 and 225, as well as data record 222 and its subordinated records, data records 227 and 228. The second table consists of customer data record 221 and its subordinated payment data record 226 and customer data record 222, and its subordinated payment records, 229 and 230.

A different view of an order structure that is manifested in the same PAIF is a so-called object, in an object oriented data model, where given customer record and all its subordinated order data records and payment data records, constitute collectively an object Thus, in this particular example there exists two objects, the first of which consists of a customer data record 221 and its subordinated records, 223, 224, 225 and 226, whereas second object consists of customer data record 222 and its subordinated data record 227, 228, 229 and 230.

Accordingly, the PAIF of the invention has an inherent advantage of being capable of representing at the same time (depending upon the desired application) a hierarchical data base, a relational data base and/or an object data base, without the necessity to manipulate the data. Of course, each of the specified data records can be of more complex structure, e.g. similar to physical data record 211, depicted in FIG. 11a.

It should be noted that the PAIF of FIGS. 10, 11A and 11B illustrate only one out of many possible variants of representing efficiently a relationship in a PAIF.

Preferably, the database file management system of the invention should be associated with known per se concurrency and/or distributed capabilities so as to enable a plurality of users to access virtually simultaneously to the database. The database may be located in a central location, or distributed among two or more remote locations.

Turning now to FIGS. 12A–D, there are shown four benchmark graphs demonstrating the enhanced performance, in terms of response time and file size of database utilizing a file management system of the invention vs. commercially available Ctree based database. The inserts are realized through Uniface application running in Windows (for workgroup) operating system.

Figure 12A:
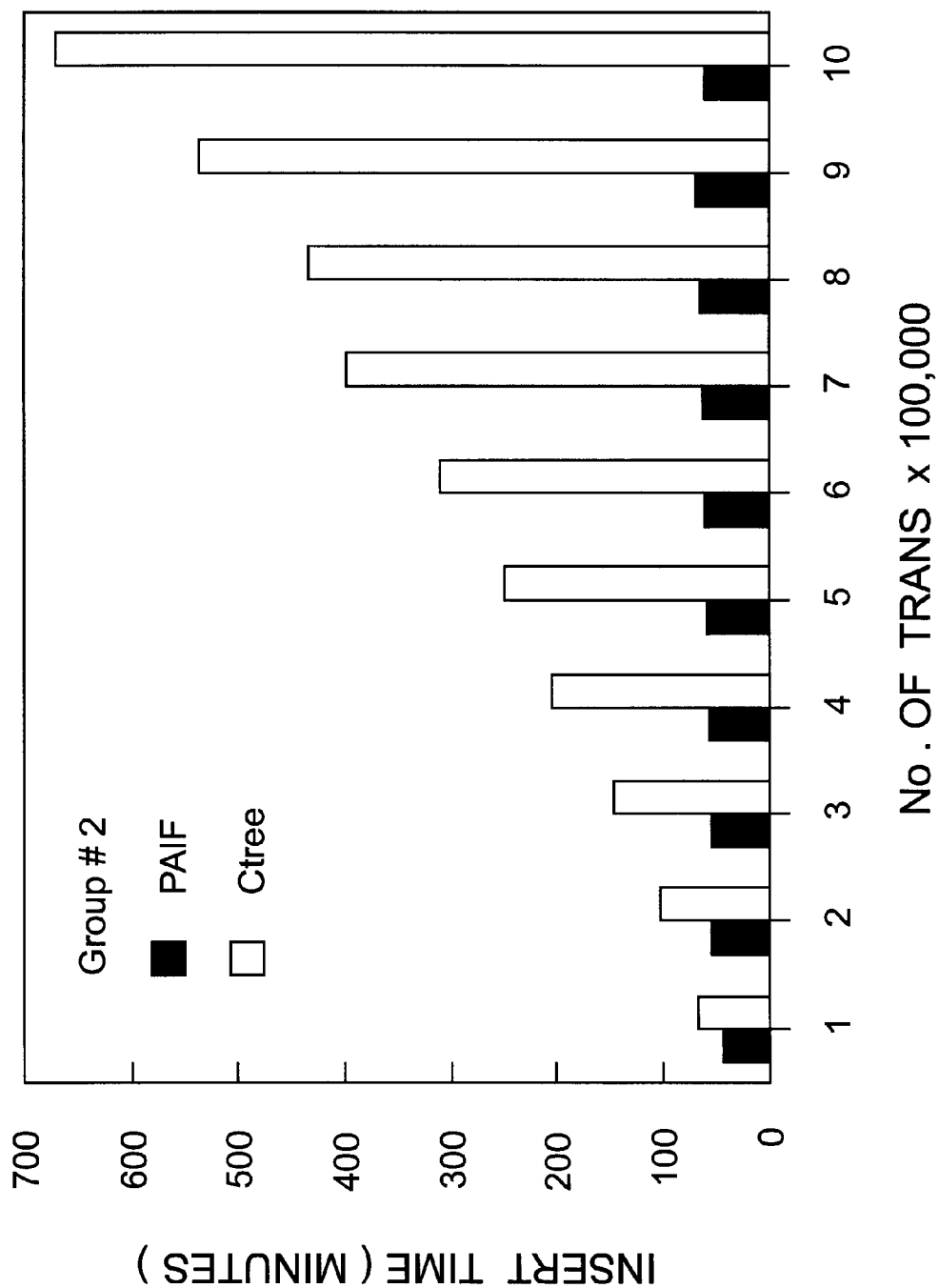
FIG. 12A–D show four benchmark graphs demonstrating the enhanced performance, in terms of response time and file size, of a database utilizing a file management system of the invention vs. commercially available Ctree based database.

The benchmark of FIG. 12A concerns measuring the time in minutes for inserting an ever increasing number of a priori sorted data records to a file (0–1,000,000). As shown in FIG. 12A, the larger number of inserts the greater is the improvement in terms of response time of the database system of the invention. Thus inserting 1 million records takes about 669 minutes in the Ctree based database as compared to only 65 minutes in the system of the invention. Moreover, the response time in the file management system of the invention increases by only a small extent as the number of records increases, as opposed to significant increase in the response time in the counterpart system according to the prior art.

Figure 12B:
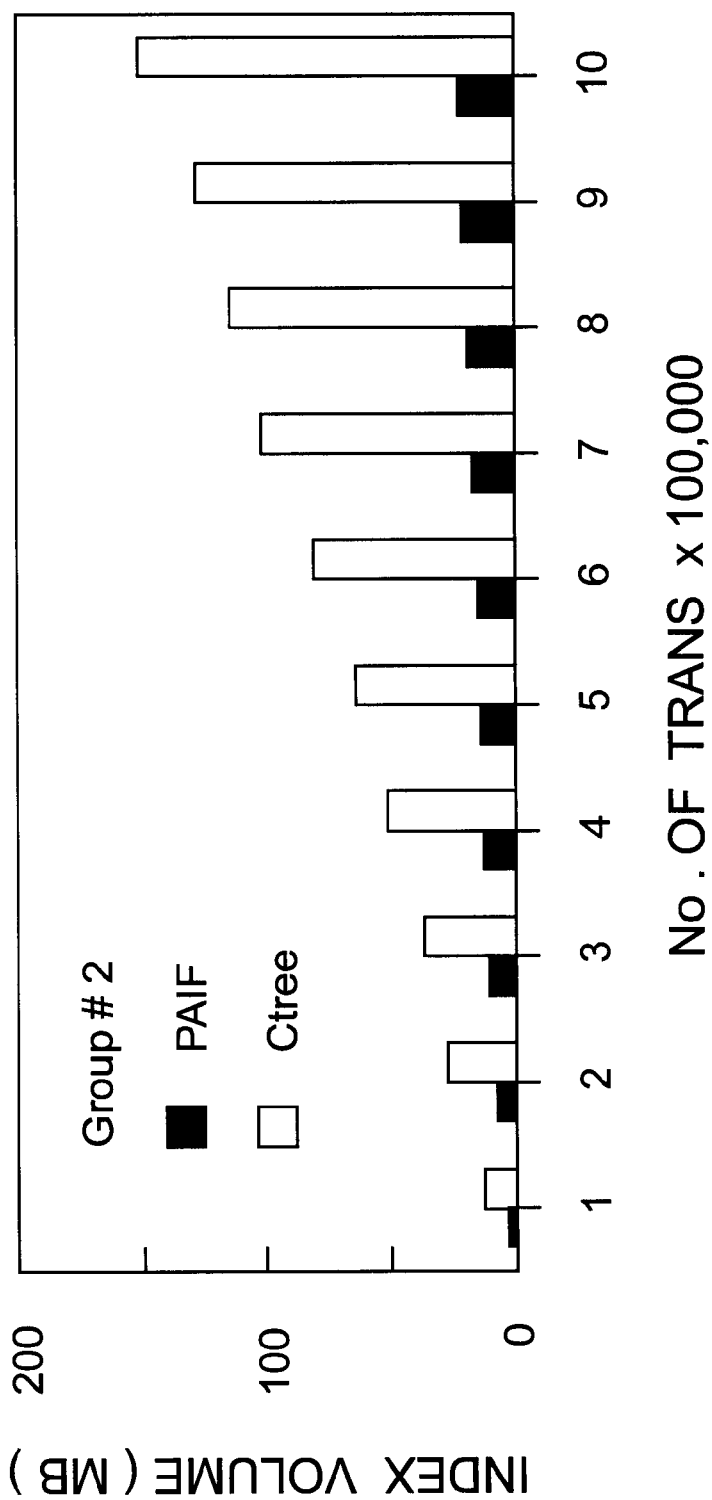
Figure 12C:
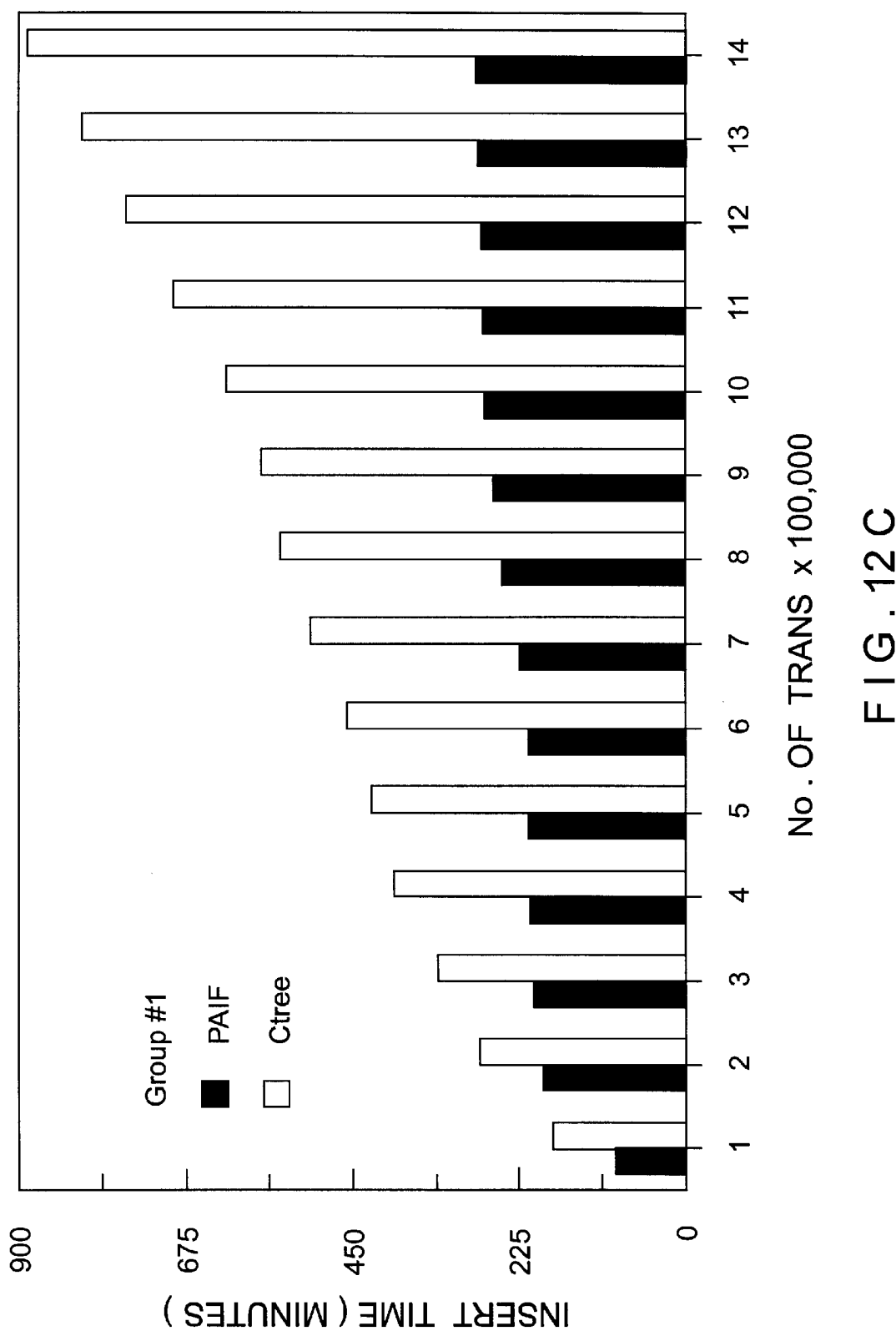
Figure 12D:
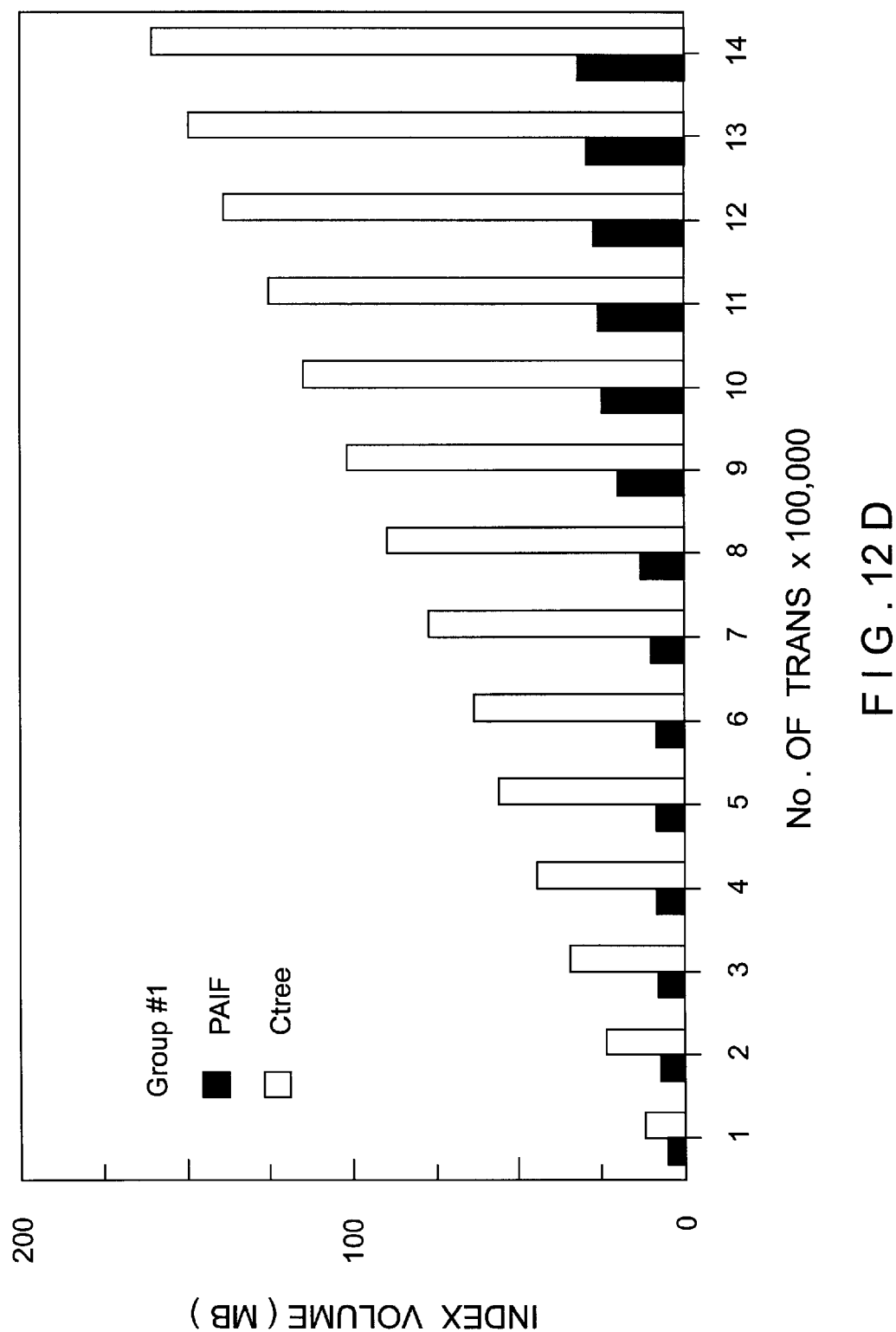
Figure 13A:
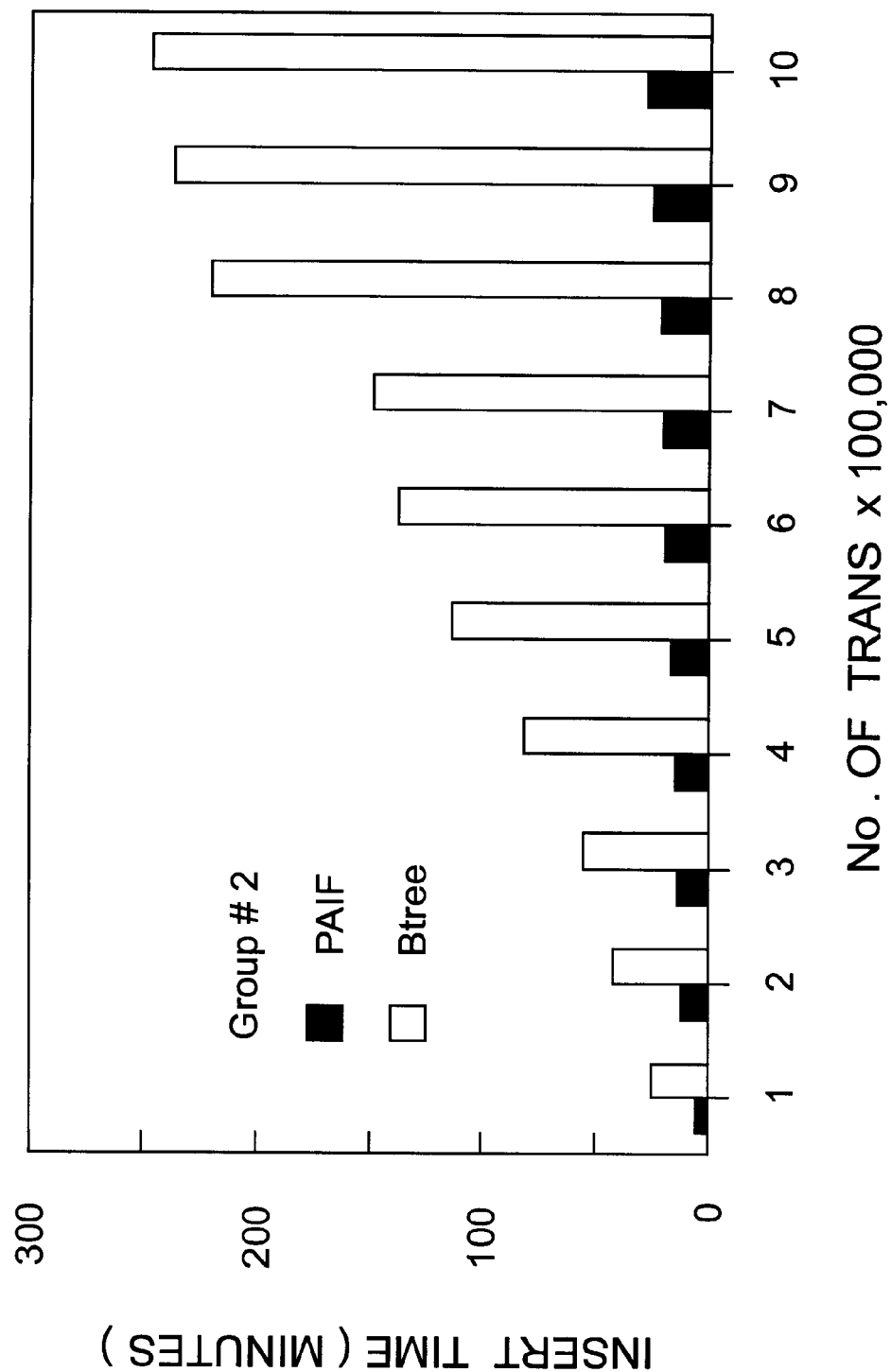
FIG. 13A–D show four benchmark graphs demonstrating the enhanced performance, in terms of response time and file size, of a database utilizing a file management system of the invention vs. commercially available Btree based database.
Figure 13B:
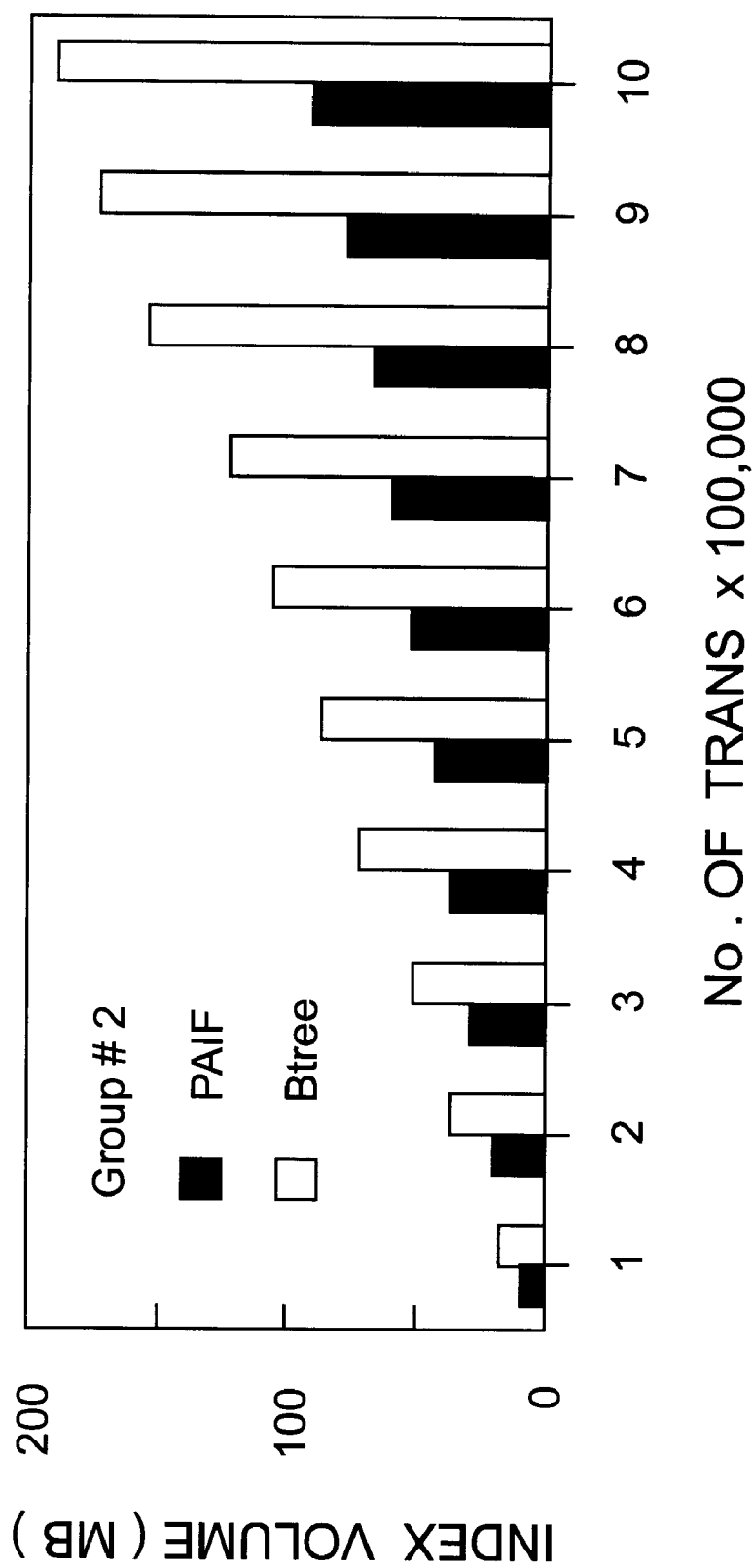
Figure 13C:
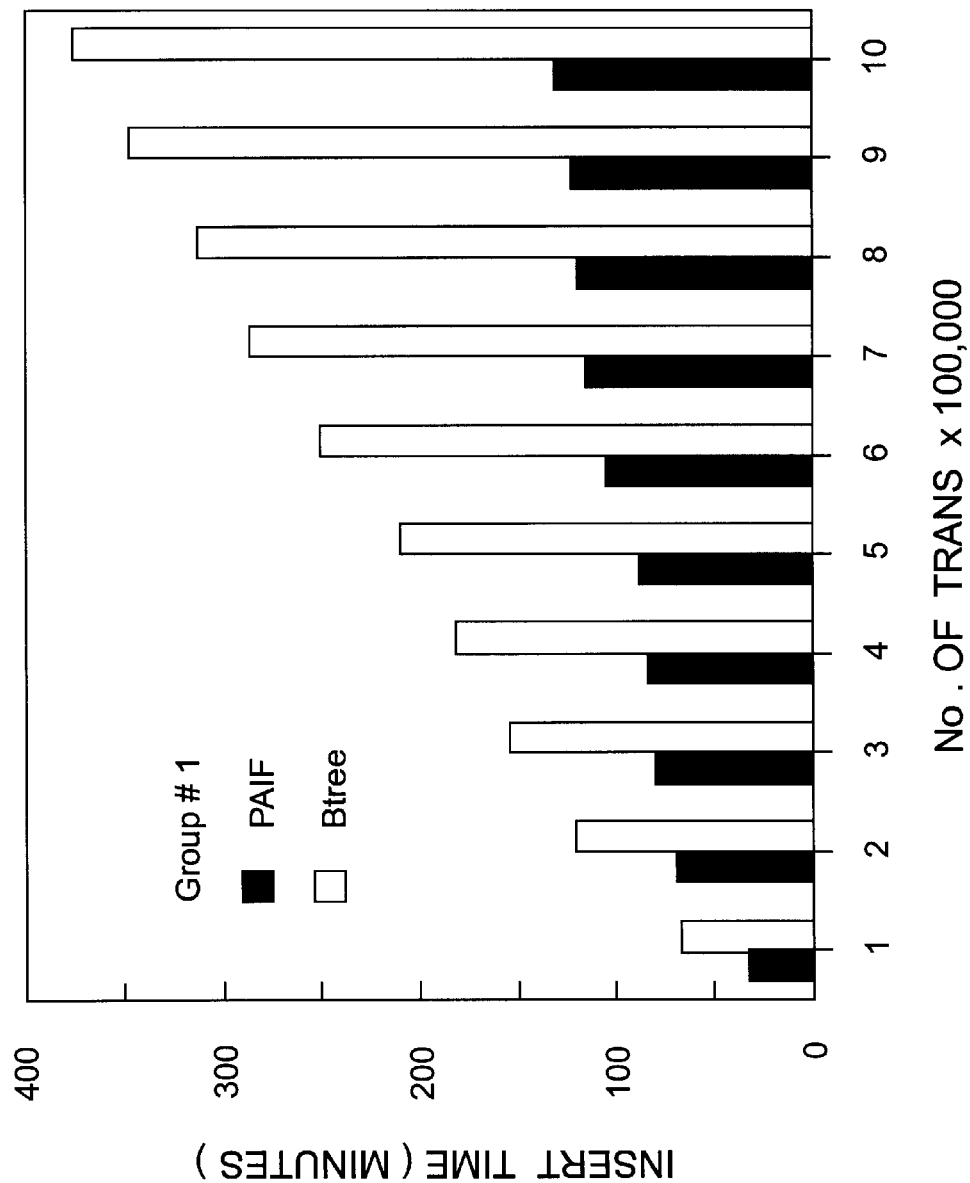
Figure 13D:
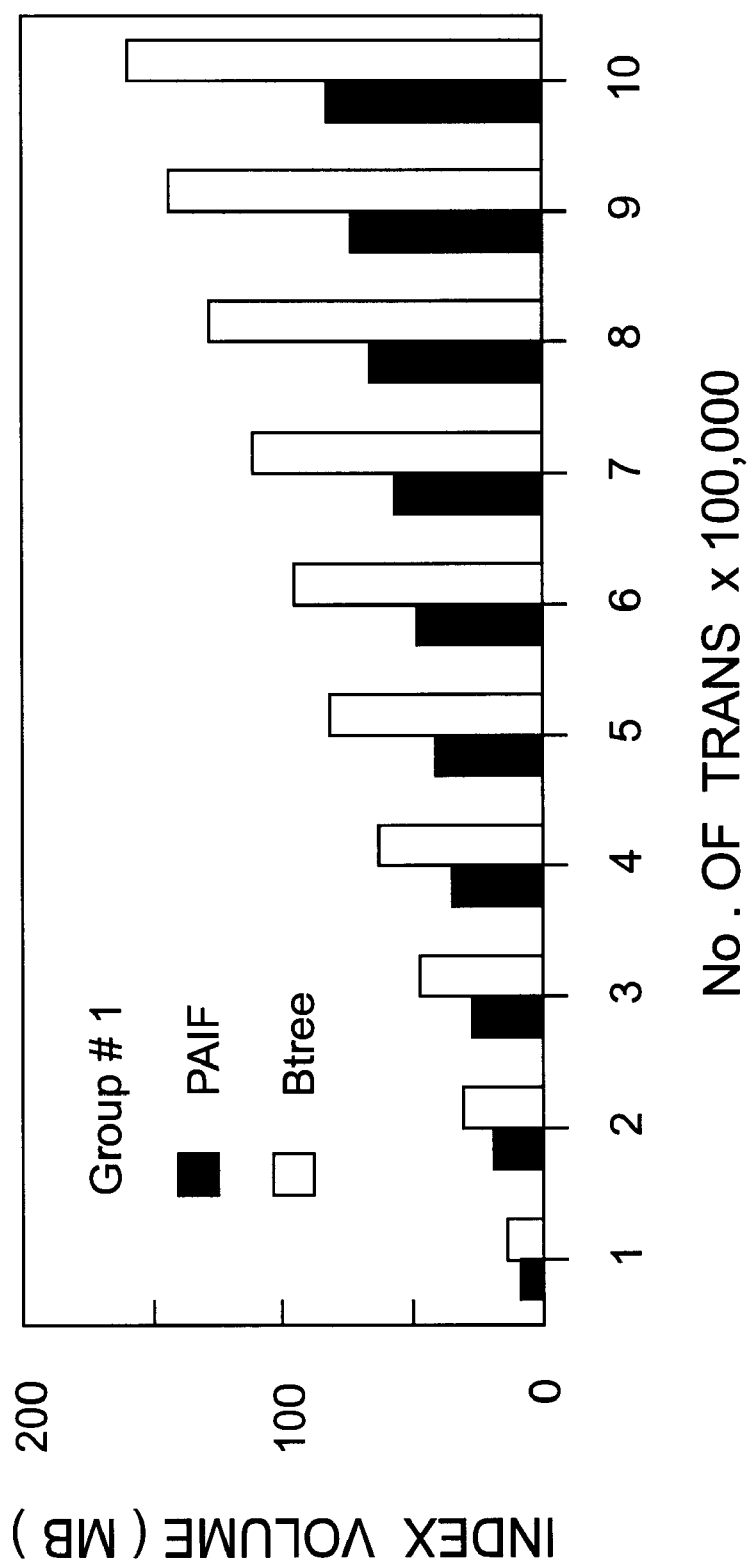

The benchmark of FIG. 12B illustrates the file size in mega bytes as a function of number of data records in the file (0–1,000,000). As shown in FIG. 12B, the larger number of records the greater is the improvement in terms of file size in the database system of the invention. Thus for 1 million records the file size of Ctree based file is about 151 mega byte as compared to only 22 mega byte in the database of the invention.

Graphs 12C and 12D are similar to those shown in FIGS. 12A and 12B apart from the fact that in the former (12C and 12D) the data records are inserted randomally whereas in the latter (12A and 12B) the data records are a priori sorted according to search key. As shown the results are as before i.e. the system of the invention is more efficient in terms of both response time and file size.

FIGS. 13A–D illustrates a benchmark graphs of a system of the invention (operating under DOS operating system) vs. commercially available Btree based database system. The results are as before i.e. the system of the invention is more efficient in terms of both response time and file size.

The present invention has been described with a certain degree of particularity but it should be understood that various modifications and alteration may be made without departing from the scope or spirit of the invention as defined by the following claims.

What is claimed is:

1. A data processing system including a processor device associated with a memory device; said processor device is capable of running at least one user application program capable of communicating with a database management system that includes a database file management system, for accessing data records stored in said memory device; said database file management system comprising:
at least one probabilistic access indexing file (PAIF) that includes:
a plurality of nodes each of which, except for the leaf nodes, is connected by means of at least one link to a respective at least one child node; each leaf node in said PAIF is associated with at least one data record accessible to said user application program; at least a portion of said data record constitutes an n-long-bit search-key having a most-significant-bit (MSB) thereof at an offset 0 and the remaining n−1 bits thereof at respective offsets 1 to n−1;
selected nodes in said PAIF represent, each, a given offset of an l-bit-long search-key-portion within said n-long-bit search key; link(s) originated from each one of said selected nodes represents, each, a unique value of said l-bit-long search key portion; for each one of said selected nodes, except for the leaf node, there exists at least one node, subordinated thereto, having an offset larger than the given offset of said one selected node;
whereby for any search key in a record associated with a leaf node of said PAIF, there is defined a search path that includes a series of units, each consisting of a node from among said selected nodes, and a link; the search path commencing at the root node and ending at said leaf node such that for any unit in the series, the value of the l-bit-long search-key-portion at a given offset as indicated, respectively by the link and the node of said unit, conforms the value of the corresponding l-bit-long portion at said given offset within of said search key.

2. The data processing system of claim 1, wherein the PAIF having at least one sub-PAIF's being arranged, each, in a block; said blocks are arranged as an essentially balanced tree of blocks.

3. The data processing system according to claim 1, wherein at least some data records that are associated to said leaf nodes are held in at least one separate file.

4. The data processing system according to claim 1, wherein at least one leaf is associated with more than one data record.

5. The data processing system according to claim 1, wherein said data records are grouped in at least two sub-PAIF each being indicative of a given and distinct type of data and wherein all data records belonging to a given sub-PAIF, from among said at least two sub PAIFs, are tagged with the same data type ID.

6. The data processing system according to claim 5, wherein said data type ID is prefixed to said search key.

7. The data processing system according to claim 5, wherein the search keys of data records that belong to different sub-PAIFs having different search key size.

8. The data processing system according to claim 1, wherein the value of l in said l-bit-long search key portion is 4, thereby constituting a 4-bit-long search key portion.

9. The data processing system according to claim 1, wherein the value of l in said l-bit-long search key portion is 1, thereby constituting a 1-bit-long search key portion.

10. The data processing system according to claim 1, wherein at least one node from among the selected nodes in said PAIF having a different l value than the l value of the remaining nodes from among the selected nodes.

11. The data processing system according to claim 1, wherein database file management system supports the ODBC standard.

12. The data processing system according to claim 1, wherein at least one data record includes more than one search key.

13. The data processing system according to claim 1, wherein said PAIF includes one physical occurrence of at least two data records, such that there are defined at least two search paths that lead to the same at least two data records.

14. A method for inserting a new data record into the PAIF according to claim 1, comprising executing of the following steps in said processor:
  i. advancing along a reference path commencing from the root node and ending at a reference data record associated to a leaf node;
  ii. comparing the search key of the reference data record to that of the new data record for determining a discerning offset being the smallest offset of the search key portion that discerns the two;
  iii. proceeding to one of the following steps (iii.0–iii.3) depending upon the value of the discerning offset as follows:
    iii.0 if the data records are equal then terminate; or
    iii.1 if the discerning offset matches the offset indicated by one of the nodes in the reference path, add another link originating from said one node and assign to said link the value of the search key portion at the discerning offset taken from the search key of the new data record; or
    iii.2 if the discerning offset is larger than that indicated by the leaf node that is linked, by means of a link, to the reference data record:
      iii.2.1 disconnect the link from the reference data record and move the link to a new node; the new node is assigned with a value of the discerning offset;
      iii.2.2 connect the reference data record to the new node which becomes a leaf node, and assign to the link a value of the search-key-portion at the discerning offset taken from the search key of the reference data record;
      iii.2.3 connect by means of a link the new data record to the new node and assign to the link a value of the search-key-portion at the discerning offset taken from the search key of the new data record; or
    iii.3 if conditions iii.0, iii.1 and iii.2 are not met, there exists, in the reference search path, a father node and a child node thereof such that the discerning offset is, at the same time, larger than the offset assigned to the father node and smaller than the offset assigned to the child node; apply the following sub-steps:
      iii.3.1 disconnect the link from the father node to the child node and shift the link to a new interim node and assign to the new interim node the value of said discerning offset;
      iii.3.2 connect by means of a link the new data record to said new interim node; the value assigned to the link is that of the search-key-portion at the discerning offset, as taken from the search key of the new data record;
      iii.3.3 connect by means of a new link the new interim node to the child node such that said new interim node becomes a new father node, assign a value to said link being the search-key-portion at the offset indicated by the new father node, taken from the search key of the reference data record.

15. A method for finding a sought data record in the PAIF according to claim 1, the sought data record having a given search key; the method comprising executing of the following steps in said processor:
  i. advancing along a search path commencing from the root node and ending at a data record linked to a leaf node, and for each current node in the search path, performing the following sub-steps:
    i.1 for each link originated from the current node: comparing the search-key-portion of the sought data record at the offset defined by the current node to a search-key-portion value assigned to said link; in case of a match advancing along said link and returning to step i;
    i.2. if none of the links originated from the current node matches the search-key-portion of the sought data record, then the sought data record is not found;
    i.3 if a data record, constituting a reference data record, is reached, comparing the search key of the sought data record as a whole, to that of the reference data record;
      i.3.1 in case of a match, the sought data record is found; or
      i.3.2 in the case of mismatch, then the sought data record is not found.

16. A method for deleting a sought data record in the PAIF according to claim 1,
  the leaf node that is linked to the sought data record constituting a target node; the father of the target node constituting a predecessor target node; the link that connects the predecessor target node to the target node constituting a predecessor link, and the link that connects the target node to a child node thereof, or to a data record other than the sought data record, constituting a target link;
  the method comprising executing of the following steps in said processor:
  find the sought data record in said PAIF, in the case that said sought data record is not found then terminate the delete procedure;
  in the case that said sought data record is found, executing the following step:
    i. delete the sought data record and the link that links the target node to said sought data record;
    ii. if the number of links that remain in the target node is larger than or equal to 2, then the deletion procedure terminates;
    iii. if the number of links that remain in the target node is exactly one, then:
      iii.1 bypass the target node by connecting the predecessor link from the predecessor node to said child node or to a data record which the case may be.

17. The data processing according to claim 1, wherein said PAIF represents ordered structure of said data records.

18. A memory for storing data for access by an application program being executed on a data processing system, comprising:
  at least one probabilistic access indexing file (PAIF) that includes:
    a plurality of nodes each of which, except for the leaf nodes, is connected by means of at least one link to a respective at least one child node; each leaf node in said PAIF is associated with at least one data record accessible to said user application program; at least a portion of said data record constitutes an n-long-bit search-key having a most-significant-bit (MSB) thereof at an offset 0 and the remaining n−1 bits thereof at respective offsets 1 to n−1;

selected nodes in said PAIF represent, each, a given offset of an l-bit-long search-key-portion within said n-long-bit search key; link(s) originated from each one of said selected nodes represents, each, a unique value of said l-bit-long search key portion; for each one of said selected nodes, except for the leaf node, there exists at least one node, subordinated thereto, having an offset larger than the given offset of said one selected node;

whereby for any search key in a record associated with a leaf node of said PAIF, there is defined a search path that includes a series of units, each consisting of a node from among said selected nodes, and a link; the search path commencing at the root node and ending at said leaf node such that for any unit in the series, the value of the l-bit-long search-key-portion at a given offset as indicated, respectively by the link and the node of said unit, conforms the value of the corresponding l-bit-long portion at said given offset within said search key.

19. A data processing system including a processor device associated with a memory device; said processor device is capable of running at least one user application program capable of communicating with a database management system that includes a database file management system, for accessing data records stored in said memory device; said database file management system comprising:

at least one probabilistic access indexing file (PAIF) having a plurality of nodes and links;

the leaf nodes of said PAIF are associated each with at least one data record accessible to said user application program and wherein at least a portion of said data record constitutes at least one search-key;

selected nodes in said PAIF represent, each, a given offset of a search key portion within said search key; link(s) originated from each given node from among said selected nodes, represent, each, a unique value of said search key portion;

the PAIF having at least two sub-PAIFs being arranged, each, in a block;

said database file management system is further capable of arranging said blocks as an essentially balanced tree of blocks.

20. The data processing system according to claim 19, wherein at least some data records that are associated to said leaf nodes are held in at least one separate file.

21. The data processing system according to claim 19, wherein at least one leaf link is associated with more than one data record.

22. The data processing system according to claim 19, wherein said data records are grouped in at least two sub-PAIFs each being indicative of a given and distinct type of data and wherein all data records belonging to a given sub-PAIF, from among said at least two sub PAIFs, are tagged with the same data type ID.

23. The data processing system according to claim 22, wherein said data type ID is prefixed to said search key.

24. The data processing system according to claim 22, wherein the search keys of data records that belong to different sub-PAIFs having different search key size.

25. The data processing system according to claim 19, wherein the given offset is 4-bit-long.

26. The data processing system according to claim 19, wherein the given offset is 1-bit-long.

27. The data processing system according to claim 19, wherein at least one node from among the selected nodes in said PAIF having an offset of a different l value than the 1-bit-long value of the remaining nodes from among the selected nodes.

28. The data processing system according to claim 19, wherein the database file management system supports the ODBC standard.

29. The data processing system according to claim 19, wherein at least one data record includes more than one search key.

30. The data processing system according to claim 19, wherein said PAIF includes one physical occurrence of at least two data records, such that there are defined at least two search paths that lead to the same at least two data records.

31. A method for inserting a new data record into the PAIF according to claim 19, comprising executing of the following steps in said processor:

i. advancing along a reference path commencing from the root node and ending at a reference data record associated to a leaf node;

ii. comparing the search key of the reference data record to that of the new data record for determining a discerning offset being the smallest offset of the search key portion that discerns the two;

iii. proceeding to one of the following steps (iii.0–iii.3) depending upon the value of the discerning offset as follows:

iii.0 if the data records are equal then terminate; or iii.1 if the discerning offset matches the offset indicated by one of the nodes in the reference path, add another link originating from said one node and assign to said link the value of the search key portion at the discerning offset taken from the search key of the new data record; or iii.2 if the discerning offset is larger than that indicated by the leaf node that is linked, by means of a link, to the reference data record:

iii.2.1 disconnect the link from the reference data record and move the link to a new node; the new node is assigned with a value of the discerning offset;

iii.2.2 connect the reference data record to the new node which becomes a leaf node, and assign to the link a value of the search-key-portion at the discerning offset taken from the search key of the reference data record;

iii.2.3 connect by means of a link the new data record to the new node and assign to the link a value of the search-key-portion at the discerning offset taken from the search key of the new data record; or iii.3 if conditions iii.0, iii.1 and iii.2 are not met, there exists, in the reference search path, a father node and a child node thereof such that the discerning offset is, at the same time, larger than the offset assigned to the father node and smaller than the offset assigned to the child node; apply the following sub-steps:

iii.3.1 disconnect the link from the father node to the child node and shift the link to a new interim node and assign to the new interim node the value of said discerning offset;

iii.3.2 connect by means of a link the new data record to said new interim node; the value assigned to the link is that of the search-key-portion at the discerning offset, as taken from the search key of the new data record;

iii.3.3 connect by means of a new link the new interim node to the child node such that said new interim node becomes a new father node, assign a value to said link being the search-key-portion at the offset indicated by the new father node, taken from the search key of the reference data record.

32. A method for finding a sought data record in the PAIF according to claim 19, the sought data record having a given search key; the method comprising executing of the following steps in said processor:

i. advancing along a search path commencing from the root node and ending at a data record linked to a leaf node, and for each current node in the search path, performing the following sub-steps:

i.1 for each link originated from the current node: comparing the search-key-portion of the sought data record at the offset defined by the current node to a search-key-portion value assigned to said link in case of a match advancing along said link and returning to step i;

i.2. if none of the links originated from the current node matches the search-key-portion of the sought data record, then the sought data record is not found;

i.3 if a data record constituting a reference data record is reached, comparing the search key of the sought data record as a whole, to that of the reference data record;

i.3.1 in case of a match, the sought data record is found; or i.3.2 in the case of mismatch, then the sought data record is not found.

33. A method for deleting a sought data record in the PAIF according to claim 19, the leaf node that is linked to the sought data record constituting a target node; the father of the target node constituting a predecessor target node; the link that connects the predecessor target node to the target node constituting a predecessor link, and the link that connects the target node to a child node thereof, or to a data record other than the sought data record, constituting a target link;

the method comprising executing of the following steps in said processor:

find the sought data record in said PAIF, in the case that said sought data record is not found then terminate the delete procedure;

in the case that said sought data record is found, executing the following step:

i. delete the sought data record and the link that links the target node to said sought data record;

ii. if the number of links that remain in the target node is larger than or equal to 2, then the deletion procedure terminates;

iii. if the number of links that remain in the target node is exactly one, then:

iii.1 bypass the target node by connecting the predecessor link from the predecessor node to said child node or to a data record which the case may be.

34. The data processing according to claim 19, wherein said PAIF represents ordered structure of said data records.

35. A memory for storing data for access by an application program being executed in a data processing system comprised of:

at least one probabilistic access indexing file (PAIF) having a plurality of nodes and links;

the leaf nodes of said PAIF are associated each with at least one data record accessible to said user application program and wherein at least a portion of said data record constitutes at least one search-key;

selected nodes in said PAIF represent, each, a given offset of a search key portion within said search key; link(s) originated from each given node from among said selected nodes, represent, each, a unique value of said search key portion;

the PAIF having at least two sub-PAIFs being arranged, each, in a block;

said database file management system is further capable of arranging said blocks as an essentially balanced tree of blocks.

36. A data processing system including a processor device associated with a memory device; said processor device is capable of running at least one user application program capable of communicating with a database management system that includes a database file management system, for accessing data records stored in said memory device; said database file management system comprising:

at least one probabilistic access indexing file (PAIF) having a plurality of nodes and links;

the leaf nodes of said PAIF are associated each with at least one data record accessible to said user application program and wherein at least a portion of said data record constitutes at least one search-key;

selected nodes in said PAIF represent, each, a given offset of a search key portion within said search key; link(s) originated from each given node from amongst said selected nodes, represent, each, a unique value of said search key portion;

the PAIF having at least two sub-PAIFs being arranged, each, in a block;

said PAIF represents ordered structure of said data records.

37. A method of maintaining a balanced tree structure when a block in the tree is filled with nodes; said block constituting a full block; the tree including blocks each accommodating a plurality of nodes and links originated from said nodes; leaf nodes from among said nodes are connected to data records; the method comprising executing the following steps:

(i) replacing said full block with at least two split blocks such that few from among the nodes of said split block are accommodated within one of said split blocks and the remaining nodes from among the nodes of said split block are accommodated within the other split block;

(ii) copying at least one node from among said nodes into a block such that said at least two split blocks being children blocks thereof and the search path characteristics are retained.

38. A memory for storing data for access by an application program being executed on a data processing system; the data including a balanced tree that was generated by the method of claim 37.

* * * * *